(12) United States Patent
Bruzzone et al.

(10) Patent No.: US 11,552,836 B1
(45) Date of Patent: Jan. 10, 2023

(54) SYSTEMS AND METHODS FOR CALCULATING BEAMFORMING WEIGHTS USED IN WIRELESS NETWORK DISCOVERY, SYNCHRONIZATION, AND REFERENCE SIGNAL WAVEFORM IDENTIFICATION

(71) Applicant: Tarana Wireless, Inc., Santa Clara, CA (US)

(72) Inventors: Stephen P. Bruzzone, San Jose, CA (US); Thomas Svantesson, Santa Clara, CA (US); Dale A. Branlund, Portola Valley, CA (US)

(73) Assignee: Tarana Wireless, Inc., Milpitas, CA (US)

( * ) Notice: Subject to any disclaimer, the term of this patent is extended or adjusted under 35 U.S.C. 154(b) by 0 days.

(21) Appl. No.: 17/515,191

(22) Filed: Oct. 29, 2021

Related U.S. Application Data

(60) Division of application No. 16/933,832, filed on Jul. 20, 2020, now Pat. No. 11,165,620, which is a continuation of application No. 16/537,413, filed on Aug. 9, 2019, now Pat. No. 10,756,939.

(51) Int. Cl.
*H04L 27/26* (2006.01)
(52) U.S. Cl.
CPC ........ *H04L 27/265* (2013.01); *H04L 27/2662* (2013.01); *H04L 27/2691* (2013.01)
(58) Field of Classification Search
CPC .............. H04L 27/265; H04L 27/2662; H04L 27/2691
USPC ........................................................ 375/260
See application file for complete search history.

(56) References Cited

U.S. PATENT DOCUMENTS

| | | | |
|---|---|---|---|
| 6,757,527 B1 | 6/2004 | Dahlbaeck et al. | |
| 10,756,939 B1 | 8/2020 | Bruzzone et al. | |
| 2004/0247055 A1 | 12/2004 | Hui | |
| 2006/0233270 A1* | 10/2006 | Ahn | H04L 27/2675 375/260 |
| 2008/0117997 A1* | 5/2008 | Maltsev | H04L 25/0248 375/267 |
| 2011/0080961 A1 | 4/2011 | Hui et al. | |
| 2011/0211490 A1 | 9/2011 | Nikula et al. | |

(Continued)

OTHER PUBLICATIONS

U.S. Appl. No. 16/933,832 titled Systems and Methods for Wireless Network Discovery and Synchronization Using Spatial Whiteners, Matched Filters, and Adaptive Beamformers to Identify Reference Signal Waveforms filed Jul. 20, 2021, pp. all.

(Continued)

*Primary Examiner* — Kevin M Burd
(74) *Attorney, Agent, or Firm* — Stoel Rives LLP

(57) ABSTRACT

Physical layer processing methods for network acquisition by remote nodes in wireless communication systems are described herein. New methods for wireless network discovery and synchronization by remote nodes are described herein that utilize spatial (e.g., antenna array) processing algorithms which may achieve enhanced functioning in challenging radio frequency environments, such as those containing interference and multipath distortion effects. These methods may include advantageous use of spatial whiteners and associated pluralities of adaptive beamformers to detect network reference and synchronization signals and estimate their parameters.

20 Claims, 13 Drawing Sheets

(56) References Cited

U.S. PATENT DOCUMENTS

2014/0056378 A1  2/2014  Harel et al.
2015/0030092 A1  1/2015  Krishnamurthy

OTHER PUBLICATIONS

U.S. Appl. No. 16/537,413 titled "Systems and Methods for Wireless Network Discovery and Synchronization Using Spatial Whiteners, Matched Filters, and Adaptive Beamformers to Identify Reference Signal Waveforms" filed Aug. 9, 2019, pp. all.

* cited by examiner ns and methods for
calculating beamforming weights
used in wireless network
discovery, synchronization, and
reference signal waveform
identification

CROSS-REFERENCE TO RELATED APPLICATION(S)

This application is a divisional application of U.S. patent application Ser. No. 16/933,832, filed Jul. 20, 2020 and issued as U.S. Pat. No. 11,165,620 on Nov. 2, 2021, which is a continuation of U.S. patent application Ser. No. 16/537,413, filed Aug. 9, 2019 and issued as U.S. Pat. No. 10,756,939 on Aug. 25, 2020. The aforementioned applications are incorporated herein by reference, in its entirety, for any purpose.

TECHNICAL FIELD

Physical layer processing methods for network acquisition by remote nodes in wireless communication systems are described herein, for example, for wireless systems in wide-area networks (WANs) as utilized for cellular and wireless internet services. New methods for wireless network discovery and synchronization are described herein that utilize spatial (e.g., antenna array) processing algorithms, examples of which may achieve enhanced functioning in challenging radio frequency environments containing interference and multipath distortion effects.

BACKGROUND

Wireless internet and cell phone services operate primarily in wireless frequency bands allocated by the FCC for that purpose. These licensed bands regulate usage to minimize signal congestion and prevent impaired functioning due to destructive interference between incompatible network and signal formats. While the use of licensed bands circumvents the interference vulnerability of existing wireless networks, it has resulted in a scarcity of usable wireless spectrum. Certain other wireless spectrum is designated as unlicensed, not requiring a license from the FCC. For example, Wi-Fi networks and some variations of the Long-Term Evolution (LTE) operate in unlicensed spectrum (e.g., in the unlicensed spectrum. However, in order to be commercially deployable, systems may need the capability to mitigate the effects of a broad range of radio-frequency (RF) interference from other users in those unlicensed bands. A similar need for interference mitigation is also arising in licensed bands, as signal crowding continues to increase in nearly all bands allocated for wireless services.

Wireless networks equipped with antenna arrays, e.g., equipped with multiple antenna elements at each network node, such as in multiple-input-multiple-output (MIMO) systems (e.g. Wi-Fi) and emerging massive MIMO systems, have the potential to exploit the spatial diversity afforded by such antenna arrays to achieve enhanced functioning in interference, noise, multipath, and other common radio signal propagation impairments, by using the arrays to dynamically shape directional response patterns (e.g., peaks and nulls) to maximize signal quality while reducing interference power. However, this potential, especially for interference mitigation, has not been the focus of these array-based systems, which limit their use of spatial diversity to generating multi-stream MIMO links based on standard spatial multiplexing methods, and/or to simple beam-pointing to increase link performance. None of these methods explicitly mitigate interference, and in fact they are highly vulnerable to it. Accordingly, array-based processing represents a largely untapped enabling technology for migrating existing and future wireless WAN systems into unlicensed bands.

Inherent to all prominent and/or practical wireless WAN standards (e.g., 3G, 4G, 5G, and proprietary variants) is a need for remote nodes (RNs) to first discover a network and achieve frequency- and time-synchronization to that network. This is an essential prerequisite to any form of substantive network (e.g., internet) access activity. For example, a RN may identify and synchronize to an intended base station node (BN). For reliable operation in unlicensed and increasingly crowded licensed bands, these essential wireless network discovery and synchronization functions will require interference mitigation, methods for which are described herein.

DETAILED DESCRIPTION

Figure 1A:
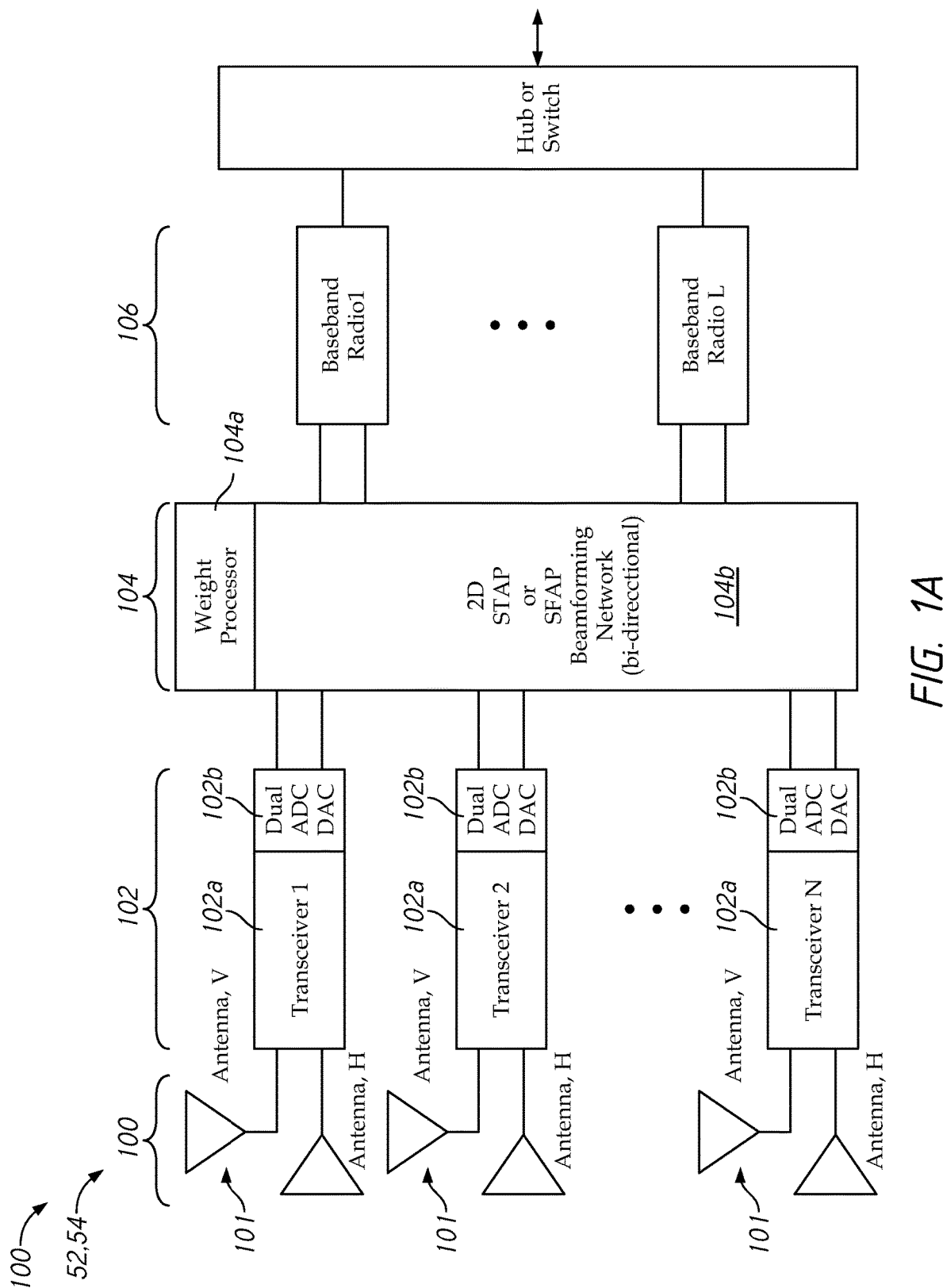
FIG. 1A is a schematic illustration of a base node and/or remote node in accordance with examples described herein.

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

The need for a RN to perform wireless network discovery and synchronization is a fundamental and ubiquitous aspect of all significant cellular and internet access WAN technologies in use today or planned by telecommunication standards bodies worldwide. Provisions for achieving this basic function have been standardized, particularly for fourth-generation (4G) and fifth-generation (5G) technologies, in the form of prescribed synchronization signals required to be transmitted by all BNs in a network, for interception and processing by RNs during their initial network search, discovery and synchronization operations. These take the form of primary synchronization signals (PSS) and secondary synchronization signals (SSS), both of which are short-duration, dedicated waveforms transmitted repeatedly and periodically at the system frame rate, or a small integer multiple or submultiple thereof. For example, 4G long-term evolution (LTE) transmits such synchronization signals every 5 msec. As used herein, the terms PSS and SSS signify signals having the stated generic purposes, and are not meant to specify or restrict their meaning to any particular wireless standard that may employ these same terms.

Upon startup or recovery from link loss, e.g., as due to a power outage or simply an extended period of inactivity, each RN in a wireless network must discover the local network by searching for and detecting these waveforms, as received from all BNs within radio reach. The detected PSS and SSS signals impart not only BN presence but also BN identities, as they carry identifier information encoded into their specific waveforms. For example, in 4G LTE the SSS can be any of a set of 168 distinct, dedicated waveforms that, when combined with 3 distinct PSS waveforms, cover in aggregate 504 unique BN identifications. The later 5G standard retains this basic PSS/SSS arrangement, but uses different waveforms for each. Methods described herein are designed to work with WAN technologies that use any combination of PSS-like and/or SSS-like synchronization/identifier signals.

In most wireless systems the RN is subject to both time offsets and frequency offsets prior to entering the network. While a time offset will be the result of an arbitrary RN startup time, e.g., being powered on or "waking up" at a random time, a frequency offset is typically caused by significant RN crystal oscillator frequency tolerances, consistent with keeping RN product costs down. Such frequency offsets can be large enough to partially or completely desensitize PSS and SSS detection. Accordingly, as a part of the process of searching for PSS and SSS signals, the RN will need to search simultaneously over a range of coarse carrier frequency (CCF) offsets in order to successfully detect the PSS and SSS signals.

Described herein are systems and methods used by a RN to perform interference-mitigating network discovery and synchronization using spatial array diversity exploitation. These are systems and methods that operate on the physical layer (e.g., radio signal waveforms) of wireless networks. Two core elements of this spatial exploitation are termed the spatial whitener, and the adaptive beamformer. Examples of the advantageous application of these core elements, along with additional signal enhancement methods described herein, may achieve the desired interference-mitigation objectives during network discovery and synchronization.

The spatial whitener is used to harden the first stage of network discovery, PSS and CCF search, to interference. In examples described herein, the RN begins network discovery from an unsynchronized initial state, as is common in many wireless systems, and proceeds by searching for PSS signals transmitted by each BN in the network. As referred to herein, PSSs may be referred to as identifier sequences, as they may include BN identifier information (e.g., PSS IDs). Such PSS signals may also innately carry timing and frequency-offset information as imposed by propagation delays and physical hardware tolerances. A conventional PSS search approach might employ a matched-filter or matched-filter bank containing the PSS waveform or waveforms (plural in the common case that multiple PSSs are in use by a network) to perform convolution-based generation of detection peaks in the matched-filter output(s), occurring at points in time that the filter aligns with occurrences of the PSS(s). If the RN is equipped with an antenna array, a traditional approach might employ multiple such matched-filters/matched-filter banks, applying one such filter or bank to each antenna data stream and summing matched-filter outputs non-coherently (e.g., in magnitude or magnitude-squared) across array data streams. In either case, heavy interference will desensitize these traditional approaches, leading to both false detection peaks and failure to produce valid PSS detection peaks, the latter occurring whenever a PSS aligns with, and consequently is masked by, strong coincident interference. These problems can be resolved in some examples, as disclosed herein, by adding spatial array diversity exploitation in the form of a spatial whitener, in a specific arrangement to effectively compress the power levels of all signals impinging on the antenna array (e.g., reduce a variation of received power across the signals incident on the antenna array), thereby reducing the relative power of strong signals (such as nearby interference) such that much weaker signals-of-interest belonging to the wireless network, e.g., the PSS in described embodiments, are unmasked and made detectable in the spatial whitener output.

In a preferred embodiment described herein, the spatial whitener is positioned as a preprocessor to the matched-filter bank, e.g., it is located between the antenna array and the matched-filter bank. As such, the spatial whitener produces an output set of whitened data streams, typically equal in number to the original data streams from the antenna array, although a smaller number of such output streams can be used to trade off computations versus performance. The data streams provided to input(s) of the spatial whitener from the antenna array may include representations of RF signals from a number of signal sources. The whitened data streams provided at output(s) of the spatial whitener include data streams having a reduced variation of received power across the representations of RF signals incident on the antenna array from multiple sources. Accordingly, the spatial whitener may equalize the received power of some or all of the received signals. The received power of the received signals may be equal in the whitened data streams in some examples, or may be simply more equal than prior to the spatial whitener in other examples. In some examples, representations of certain incident signals below a received power threshold may not be present in the whitened data streams.

The bank of matched filters is then applied to these whitened data streams, their outputs summed non-coherently, and the resultant waveform subjected to detection processing. At this point the benefits of spatial whitening may become apparent in some examples, with PSS detection peaks no longer masked even by much stronger non-PSS interference. Additional unique processing is described herein to further stabilize and normalize the whitened matched-filtering detection waveform amplitude and associated detection noise-floor. In aggregate, this whitened matched-filtering processing may be referred to herein as the spatial matched-filter (SMF). While a preferred embodiment employs the spatial whitener as a pre-processor to the matched filters, other embodiments yielding similar results can be obtained by reversing the cascade, e.g., positioning the matched filters as preprocessor to the spatial whitener. The application described herein favors the former approach both for computational savings, in that the multiple SMFs employed herein to cover multiple PSSs may otherwise each require a separate spatial whitener, and also for better detection performance in some examples by deferring the PSS matched-filter SNR boost until after the spatial whitening is done.

Generally, a matched filter (e.g., a spatial matched filter, SMF) may receive whitened data streams (e.g., from one or more spatial whiteners). The matched filter may have an impulse response intended to detect a reference signal waveform (e.g., a PSS or SSS). The matched filter may accordingly provide filtered data streams which contain indicators of a presence of the reference signal waveform in the plurality of whitened data streams. Any of a variety of indicators of the presence of the reference signal may be used (e.g., peak(s), dip(s), and/or other signal variations).

Following SMF detection, adaptive beamformers arranged in various adaptive beamformer banks (also referred to simply as beamformer banks) are utilized to further process detected BN synchronization and identifier signals to determine signal parameters. Constituent adaptive beamformers within these adaptive beamformer banks utilize one or more cross correlation vectors and inverse spatial covariance matrices to calculate weights that represent various versions of the signal and its parameters (e.g., frequency-offset, time-offset), as weights to be applied for a given adaptive beamformer to perform robust detection or reception of that signal or signal component in wide-ranging interference conditions. Detection statistics calculated from these weights then report the received signal strength in each beamformer output, and through comparison with those of other adaptive beamformers in the bank, impart the relative match of the related signal parameters to their actual received values. As the primary functional unit within these adaptive beamformer banks, further background on adaptive beamforming is provided below. Using such adaptive beamforming techniques, network discovery and synchronization may be accomplished in the presence of wireless interference in some examples (e.g., from other/extraneous signals operating in the wireless signal bandwidth) because such beamformer techniques may effectively reduce and/or cancel interference, while simultaneously increasing detection sensitivity in noise and reducing the damaging effects of multipath distortion.

In a preferred embodiment presented herein, three sequential stages of adaptive beamformer bank processing are executed following SMF detection. To maximize and/or improve performance, processing among these three stages may be cumulative, with each stage utilizing and benefitting from the information extracted by the preceding stages. The first two such adaptive beamformer bank stages process each SMF-detected PSS to extract fine carrier frequency (FCF) offset and fine timing information, respectively, thus completing the interference-mitigating network synchronization objective. The first of these may be termed the fine carrier frequency search (FCFS) beamformer bank, and the second may be termed the fine timing search (FTS) beamformer bank. The third adaptive beamformer bank stage, referred to as the SSS beamformer bank, then performs detection of associated SSS signals through interference. As referred to herein, SSSs function as secondary identifier sequences, as such SSSs include supplemental identification information (e.g., SSS IDs). These SSS IDs, when combined with the PSS ID from the same originating BN, provide the final information element used by some examples to uniquely identify each detected BN, hence completing the network discovery process. Subsequently, a remote node may synchronize to any received BN, decode its broadcast channel, and proceed at will with network entry protocols.

Additional support processing is also described herein to maximize and/or improve robust functioning in some examples. These include frame-synchronous integration of the SMF output to reinforce detection waveform peaks recurring at the frame rate, the application of voting protocols to the detection statistics generated by the SSS beamformer bank to implement high-performance multiple hypothesis test (MHT) decision functions, and multi-frame integration of FCFS beamformer bank and FTS beamformer bank detection statistics to increase signal parameter estimation accuracy.

Adaptive Beamforming

Adaptive beamforming as employed herein generally refers to a method of processing received antenna array data after the latter has been down-converted to baseband and digitized as a complex baseband data stream (e.g., multiple down-converters and/or digitizers may be used to provide digitized baseband data streams). The adaptive beamformer may be viewed as compartmentalized into a weight calculator and a linear combiner. The adaptive beamformer weights, as generated by the weight calculator, are applied to the linear combiner, which combines signals as received on the K elements of an antenna array to achieve spatial selectivity. Spatial selectivity may be used to enhance the detection and extraction of signals from complex RF environments, to enhance the signal to interference plus noise ratio (SINR), to overcome multipath distortion, and/or to remove detrimental interference via interference cancellation (IC). The weights may be derived and/or adapted by a variety of methods. Such an adaptive beamformer may be implemented as the beamformer 154 of FIG. 1B in accordance with the methods 600, 700, 800, and/or 900, as described below with respect to FIGS. 6-9.

There are two primary classes of adaptive beamformer types or design criteria, one known as the property restoral class, and the other known as the known waveform restoral class. Either class generally requires that the beamformer adaptation scheme be formulated to restore known characteristics of the desired signal. Known waveform adaptive beamformers are designed to extract a precise, known waveform transmitted by the desired signal at well-defined times for purposes of synchronization, identification, or actual beamformer training. Most communication signals possess such waveforms in the form of preambles, midambles, pilot tones, pilot codes, synchronization bursts, etc., regardless of whether they were designed for use with adaptive beamformers. The known waveform beamformer adapts to force the linear combiner output to match as closely as possible the known waveform to be restored. To the extent that such a waveform is present on the antenna array, the linear combiner output will extract and contain it, along with a minimized level of noise and interference representing the irreducible residual allowed by the received signal SNR and the interference profile at the array.

Comparably, property restoral beamformers are adapted to restore a general signal property, such as a constant modulus, a known signal constellation (e.g., 16QAM), a cyclostationary feature such as a known bit rate or symbol rate, a known carrier frequency, a known redundancy such as a cyclic prefix, and so on. An advantage of property restoral adaptive beamformers is that they can restore signals without requiring that the desired signal provide special training data, which comes at the cost of payload capacity. A disadvantage of restoral class beamformers is that they can fail to acquire the desired signal and may be captured by an interfering signal having a similar property. In addition they can be slow to converge, or require several adaptation iterations on the data to achieve convergence, making them prohibitively costly computationally.

Of these, the known waveform class may be the better choice for examples of the network discovery and synchronization operations disclosed herein, in part for its freedom from the aforementioned property restoral vulnerabilities, and in part because as it can be used to exploit waveforms (PSS and SSS) already included in wireless systems for these network discovery and synchronization purposes.

The basic function of examples of known-waveform adaptive beamformer designs described herein is to use spatial selectivity to minimize the mean-squared error between its output waveform and the training waveform or sequence (e.g., PSS, SSS in the current application) used to adapt the beamformer. In so doing, the minimum mean-squared error (MMSE) criterion may simultaneously cancel and/or reduce interference, correct propagation impairments such as multipath distortion, and suppresses noise, while balancing these functions in a manner that maximizes and/or improves the beamformer output SINR, up to the full potential afforded by the antenna array in some examples. The weight calculator to implement a MMSE class of adaptive beamformer may include a complex sampled cross-correlation vector, a sampled spatial array covariance matrix, a covariance matrix inversion and a vector matrix calculation using the aforementioned cross correlation vector and inverse covariance matrix to determine the weights. While inspired by the MMSE optimality criterion, the use of the aforementioned sampled cross-correlation vector and sampled covariance matrix (as opposed to the theoretical, statistical mean quantities) produces a practical implementation called the least-squares (LS) adaptive beamformer, referred to herein as an adaptive beamformer without further distinction. For example, the LS beamformer may be a specific embodiment of the known-waveform adaptive beamformer utilized in the processing detailed herein.

Of note, the complex cross-correlation vector is calculated as a vector of correlation between each data stream and a known system reference/training waveform or sequence. This cross-correlation vector is a term in the adaptive beamformer weights calculation that allows the beamformer to target, acquire and process a desired signal or signal component (e.g., a PSS or SSS) in complex environments containing time, frequency, and/or multipath distortion as well as multiple interfering signals, based on knowledge of this sequence. This beamformer training sequence is a unique, a priori defined real or complex data sequence, and can include frequency-shifted, time-shifted and/or frequency and time-shifted versions of the known sequence. Additionally, the known sequence can be an estimated version of the known sequence derived by other signal processing methods. The terms "training waveform" and "training sequence" are used interchangeably to denote the beamformer training data, with "sequence" being more evocative of the fact that discrete sampled data may be involved.

Additionally or alternatively, the computed beamforming weights may be combined with other weights to yield a better solution via time averaging, frequency averaging, polarization averaging or any combination of time, frequency, and polarization averaging to produce the composite weight as applied to the linear combiner. The combining method can include, but is not limited to, adding, mean, median, exponential, SINK weighted, noise rejection, or any other method that combines a plurality of weights as generated. Such examples of the combining method are described at least with respect to the methods 600, 700, 800, and 900, as described below with respect to FIGS. 6-9.

Each output sample is generated by the linear combiner function as the complex inner product of the K×1 dimensional weight vector with the K×1 dimensional sampled array data vector for a single time-sample or subcarrier, where a subcarrier corresponds to one fast Fourier transform (FFT) output bin in a frequency-domain implementation (such as used in orthogonal frequency-division multiplex (OFDM) modulation systems). In block-based operation, as utilized herein, the beamformer weights are computed and the linear combiner is applied to a K×M matrix of M consecutive or near-consecutive time-samples or subcarriers, where M is the number of time-samples in a data block, or the number of subcarriers in a frequency group known as a subband. The weight vector may optionally be conjugated in some realizations. In addition, the weight vector may be further modified by a complex scalar generated by a complex polynomial which is a function of the subcarrier index, time index, antenna element index, polarization index, or any combination of such indices. For example, such a linear combiner function may be implemented by the linear combiner 180 of FIG. 1B, implemented as part of a system 150 (which may be a beamformer bank) for the beamformer 154.

As one of its advantages, a preferred embodiment described herein may not require or utilize the linear combiner function. This simplification may be made possible by the fact that beamforming performed herein may be performed for the express purpose of computing detection statistics. These detection statistics, which measure output signal quality, can be computed directly from the beamforming weights, without requiring in some examples the explicit generation of the linear combiner output data samples as an intermediate step.

Subband Partitioned Adaptive Beamformer

An operational frequency band may be partitioned into N subbands with M OFDM subcarriers each. As described above, N adaptive beamformers would then cover the full operational band for a single wideband signal. For example, the system 150 may receive the N subbands as N data streams, as described with reference to FIG. 1B, such that N beamformers 154 may implement the system 150.

Adaptive Beamformer with Integrated Detection Statistic

In several instances herein, an adaptive beamformer within a given band or subband is used to detect the presence, absence, or relative strength of a signal of interest in the received environment. Functionally, this is implemented as a beamformer with a detection statistic calculation applied to the linear combiner output data samples. A preferred detection statistic for present purposes is to compute the normalized mean-squared error (NMSE) between the beamformer output samples and the beamformer training sequence, where amplitude normalization is used to render the statistic amplitude-invariant. A more efficient realization of this function is utilized herein to compute the detection statistic without requiring the explicit generation of the linear combiner output data samples. Detection can then be performed as a threshold test on the value of this detection statistic, or as a threshold test on a sum, or other combining function, of multiple such detection statistics computed over multiple time or frequency instances (e.g., frames). For example, such a detector may be implemented as the detector 190 of FIG. 1B, implemented as part of a system 150 (which may be beamformer bank) for an adaptive beamformer (e.g., the beamformer 154).

Multi-Stream Adaptive Beamformer

The adaptive beamformer within a given band or subband may be extended to an L-dimensional beamformer set where L represents the number of independent data streams transferred across a data link in a given subband. The weight calculator produces L weight vectors that mutually isolate the streams from one another. The MMSE (or similar)

algorithm produces weight vectors that maximize the SINR of each of L streams in the presence of the interference induced by the other L−1 streams as well as any other interference sources. Accordingly, the multi-stream adaptive beamformer produces L stream outputs across 1 through M subcarriers in each subband for all N subbands.

Multi-User Adaptive Beamformer

The method of single stream or multi-stream adaptive beamformers may be extended to multiple users within a given band or subband transmitting on the same subcarriers or group of subcarriers. This may be referred to as multi-user adaptive beamforming. In such a case, the weight calculator generates weight vectors that isolate the users from one another. The MMSE (or similar) algorithm produces weight vectors that maximize the SINR of each stream of J users in the presence of the interference induced by the other J−1 users. The other J−1 users may generate L interference sources each. For user J, there are (J−1)×L+L−1 interfering streams to cancel.

Adaptive Beamformer Bank

An adaptive beamformer bank produces more than one output within a given band or subband from a corresponding set of input array data. The above multi-stream and multi-user adaptive beamformers are examples of beamformer banks, in that they apply least two or more linear combiner operations using two or more respective weight vectors to the array data of a given data block or subband. Additionally, the terminology adaptive beamformer bank may be used to denote a bank of multiple, adaptive beamformers, each equipped with integrated detection statistics. The integrated detection statistics may be used for detecting the presence of particular signals such as training waveforms, identifier sequences (e.g., SSS sequences), or other known waveforms, and/or estimating signal parameters associated with such sequences or training waveforms (e.g., associated with PSS sequences). Constituent adaptive beamformers within the adaptive beamformer bank may be adapted to various time-shifted, frequency-shifted, or other modified versions of a known training sequence. Through this mechanism the adaptive beamformer bank may detect a desired signal when it has varying or unknown, but range-bound, parameters such as time-offset, frequency-offset, angle of arrival, polarization, Doppler effects, etc. In RN processing of PSS signals in examples described herein, the relevant signal parameters may be time-shifts occurring as a result of varying propagation delays from various base stations in the vicinity of a receiving RN, and frequency-shifts occurring primarily as a consequence of RN local oscillator crystal tolerances. A detection statistic meeting a particular criteria (e.g., a maximum detection statistic) in the adaptive beamformer bank reveals the selected (e.g., best) match, among the parameter values used in the beamformer bank, to the true parameter value, allowing it to be utilized advantageously in subsequent processing stages. Such an adaptive beamformer bank may be implemented as the system 150 with multiple beamformers 154, in FIG. 1B, in accordance with the methods 600, 700, 800, and 900, as described below with respect to FIGS. 6-9.

Adaptive Beamformer Bank Applied to Multiple-Hypothesis Testing

As one processing stage within the embodiment described herein, a large number (>100) of known SSS identifier sequences, transmitted within a subband termed the network access zone, are tested by an adaptive beamformer bank, and the top D detection statistics are sent along with their respective SSS identities to a voting pool for each array data snapshot tested. When a plurality of snapshots has been processed in this manner, the votes are counted and those SSS identities with the highest number of instances (e.g., the top three maximum results) are deemed present in the received environment. The use of such voting protocols in concert with this adaptive beamformer bank in some examples may provide a versatile and powerful multiple-hypothesis test (WIT) able to support a large decision space, while achieving highly sensitive detection and low false-alarm rates.

Generally, using such systems and methods to calculate weights for adaptive beamforming of received array data, the wireless systems disclosed herein may provide high SINR interception of network discovery and synchronization signals transmitted by neighboring and distant BNs, like those of conventional systems on licensed bands, while operating in unlicensed bands. Such systems and methods may be included in a RN, for example, as part of the wireless transceiver. Accordingly, the systems and methods described herein may operate in wireless interference imposed by other unlicensed users in unlicensed bands, as well as by other licensed users in licensed bands and/or or lightly-licensed bands. In providing such initial network discovery and synchronization capabilities, the systems and methods described herein may operate through such wireless interference, which may be called interference-resistant network discovery and synchronization.

FIG. 1A is a schematic illustration of a BN and/or RN in accordance with examples described herein. The node 100 of FIG. 1A may be used to implement either a base station node (e.g., base node 1210 of FIG. 12) and/or a remote node (e.g., remote nodes 1215 and/or 1240 of FIG. 12); synchronization and detection techniques described herein are generally intended for use by the latter, e.g., a RN. The node 100 may include four subsystems including an antenna subsystem 100, a transceiver subsystem 102, a beamforming subsystem 104, and a baseband radio subsystem 106.

The antenna subsystem 100 may include a plurality of antennas 101, which may generally include any number of antennas in an adaptive array for a remote node (RN) and/or base node. Each antenna may have 2 feed points that are orthogonally (or quasi-orthogonally) polarized. For example, the orthogonal (or quasi-orthogonal) feed points may be vertical/horizontal polarization, left-hand-circular/right-hand-circular polarization, or slant left/slant right polarization as examples. The vertical/horizontal (V/H) feed points for each antenna are shown in FIG. 1. In some examples, an array may include strictly single-polarization antennas, all of one polarization type, or of mixed polarization types. Each antenna may be passive or active. The antennas can be arrayed in a linear array, a two dimensional array or a 3-dimensional array, or in any other arrangement. Example geometries of the antennas include flat panel, circular, semi-circular, square or cubic implementations. The antennas may be placed in the array in an arbitrary fashion as well. In some examples, if dual-polarization arrays are utilized, the two polarizations may be balanced according to a number of array elements and a same type of polarization (e.g., linear horizontal and vertical, or circular left-hand and right-hand rotation polarizations) in both a BN array and a corresponding RN array. In addition, BN and RN arrays may contain differing numbers of antennas; moreover, the antenna count can vary from one RN to another or one BN to another.

Generally, the antennas may receive radio frequency (RF) signals from multiple sources. For example, signals may arrive from multiple signal sources in an RF environment. The signals from multiple sources may arrive at different angles, different strengths, and/or have different properties. In some examples, two or more signals arriving from different sources may arrive at a same angle and/or signal strength.

The transceiver subsystem 102 may include a plurality of transceivers 102a, such as a number of transceivers for a base node and/or a remote node that provide one channel for each of the 2 polarization feeds from the associated antenna as shown in FIG. 1. Each transceiver channel provides a radio frequency (RF) receiver and an RF transmitter. Each receiver and transmitter may be implemented using an encoder and/or decoder as described herein, such as with reference to FIG. 1. Accordingly, each receiver and transmitter may decode and/or encode data utilizing check codes described herein. The transceivers 102 provide coherent or quasi-coherent down-conversion and up-conversion between RF and a complex multi-stream baseband.

Each RF receiver in each transceiver may include a preselection filter, a low noise amplifier, a demodulator, a mixer, low pass filter and/or a local oscillator to convert the RF signal down to the complex baseband. The complex baseband may be converted to digital in-phase and quadrature signals using two analog-to-digital converters in a converter unit 102b. In this manner, each RF receiver may include one or more downconverters and/or digitizers used to provide a digitized baseband data stream corresponding to the RF signals incident on the antenna(s) connected to the RF receiver. The digitized data stream may include representations of the RF signals from multiple signal sources incident on the antenna(s). Utilizing multiple receivers, a set of digitized data streams may be provided, including representations of the RF signals from multiple signal sources incident on the antenna(s) of the system.

Each RF transmitter in each transceiver may include two digital-to-analog converters in the converter unit 102b, modulators, two low pass filters, a mixer and/or a local oscillator (LO) to convert the baseband signal to RF. In some examples, the LO can be shared between the receiver and the transmitter. The output of the mixer drives an RF preamplifier, transmit (Tx) filter and power amplifier completing the transmitter. The transmitter and receiver may be connected to the antenna feed via a TR switch or a diplexing filter.

The beamforming subsystem 104 operates between the transceiver subsystem 102 and the baseband radio subsystem 106, and may be bi-directional, meaning that it may function as an adaptive (receive) beamformer during the receive cycle, and as a transmit beamformer during the transmit cycle. The beamforming subsystem 104 may also be connected to the baseband radio subsystem 106 that has a plurality of baseband radios that are coupled to a hub or switch to route the data traffic. The receive cycle at the RN is of interest in the current network discovery and synchronization application, during which received data streams (e.g., complex baseband) from each of the transceivers shown in FIG. 1 are subjected to the processing stages described herein. The beamforming subsystem has a weight processor 104a and a beamforming network (BFN) 104b that may be implemented using a processor and/or other circuitry to perform the beamforming processes. The beamforming network (BFN) 104b may be referred to as a beamformer bank or an adaptive beamformer bank. In some examples, a two dimensional (2D) space-time adaptive processing (STAP), space-frequency adaptive processing (SFAP), or combined space-time-frequency adaptive processing (STFAP) bidirectional beam forming network may be used. The processing described herein may be categorized as receive-only (hence, unidirectional) STAP. In systems wherein PSS and/or SSS signaling is carried redundantly or complementarily in multiple subbands of the full signal bandwidth, the processing described herein may be applied separately and independently in each such subband instantiation. This parallel application of independent STAP processing in different signaling subbands would constitute an example of STFAP processing.

Figure 1B:
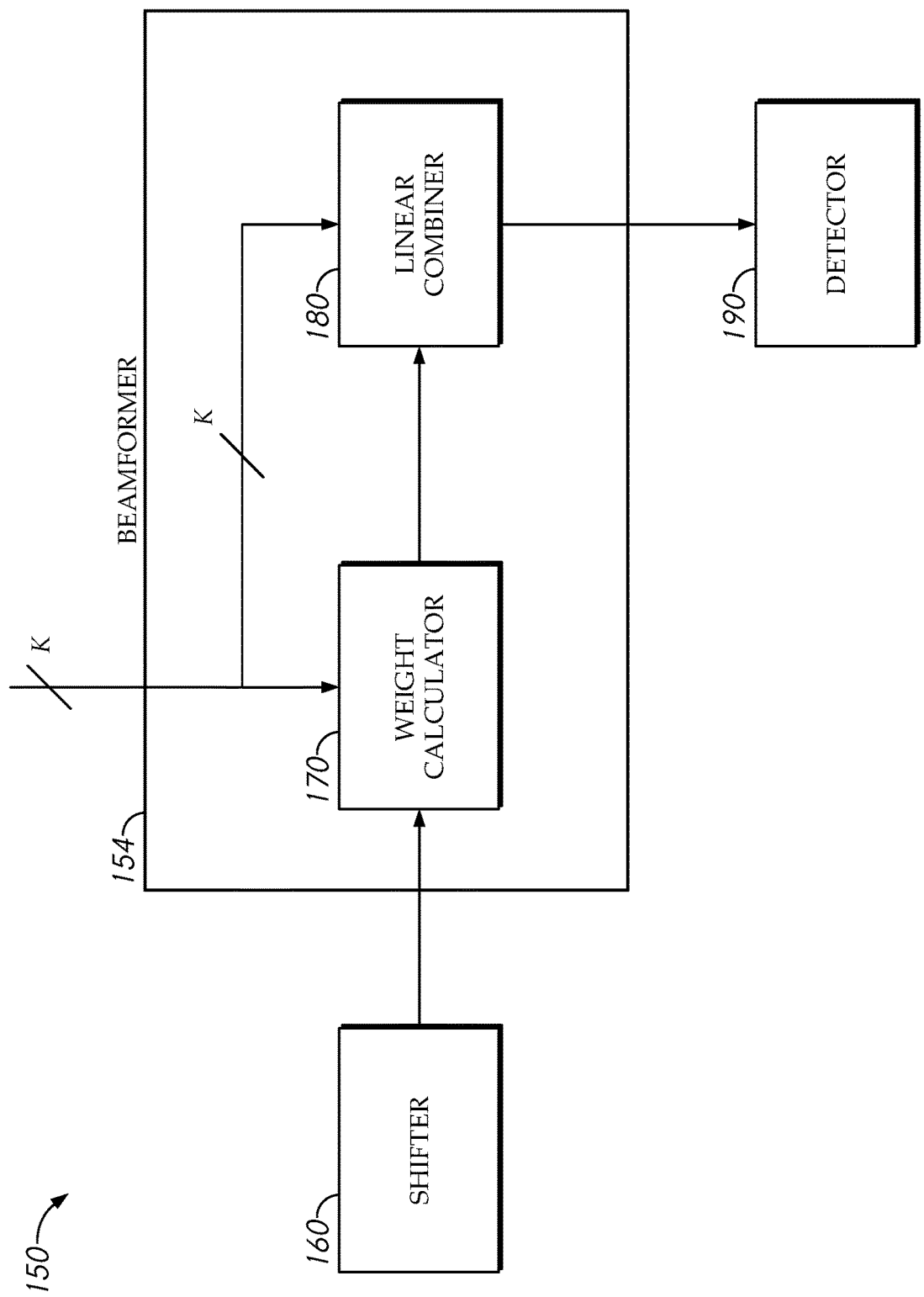
FIG. 1B is a schematic illustration of a beamformer arranged in accordance with examples described herein.

FIG. 1B is a schematic illustration of an adaptive beamformer 154 arranged in accordance with examples described herein. For example, the system 150 may be an implementation of the beamforming subsystem 104 of FIG. 1, with the beamformer 154 implementing a beamformer of the beamforming subsystem 104. As an example, the system 150 may be an adaptive beamformer bank with at least one adaptive beamformer 154 and a detector 190. The beamformer 154 receives K data streams from an antenna array. In utilizing the beamformer 154, the RF receiver system may accomplish synchronization with a BN (e.g., node 100 of FIG. 1) while resisting interference from other transmissions in the same channel. For example, if the RF receiver system is configured to receive on an unlicensed band, the beamformer 154 may facilitate network discovery and synchronization for the RF receiver system, even while other unlicensed transmission occur on that unlicensed band.

The beamformer 154 receives the K data streams and generates adaptive beamforming weights as detailed in the descriptions of PSS and SSS adaptive beamformer banks to follow. From these weights various detection statistics are calculated and utilized in parameter estimation and decision function implementations also as detailed in the following. The parameter estimation function utilizes the shifter (160) in beamformer-bank configurations described herein to apply a range of frequency-offsets and time-offsets to the targeted PSS and SSS waveforms as part of the parameter search process.

With the weights calculated, the weight calculator 154 may provide the weights to a linear combiner 180 along with the input data streams to produce beamformer output data containing the received, interference-canceled signal. The linear combiner 180 provides this output to the detector 190. The detector 190 includes a detection statistic calculation to measure the strength or SINK of the beamformer-enhanced signal as present in the linear combiner output. This detection statistic that may also be provided in the detector output, as a non-binary metric (e.g., a quality metric) accompanying the detector's signal present/absent decision. For example, in the context of an adaptive beamformer bank having a plurality of adaptive beamformers, the detector 190 may store the detection statistic result of a given beamformer and compare it with those of other adaptive beamformers 154 in the bank also receiving the K data streams. In such a case, a detector 190 may detect a maximum result (or maximum results of a voting pool) to detect specific signal waveforms and associated parameter values present in the received data.

As mentioned previously, if the adaptive beamformer is to be used strictly for detection statistic generation, e.g., the output interference-canceled signal is not needed for any further processing, the detection statistic can be computed directly from the beamformer weights, and the linear combiner can be omitted. This is the case in the present example. For example, in system 200 of FIG. 2, the adaptive beamformer 154 with the linear combiner 180 omitted may be implemented as a detection beamformer in various beamformer banks, such as the FCFS beamformer bank 264, the FTS beamformer bank 272, or the SSS beamformer bank 280. Additionally or alternatively, the beamformer 154 may be implemented in accordance with the methods 600, 700, 800, and 900, as described below with respect to FIGS. 6-9.

Figure 2:
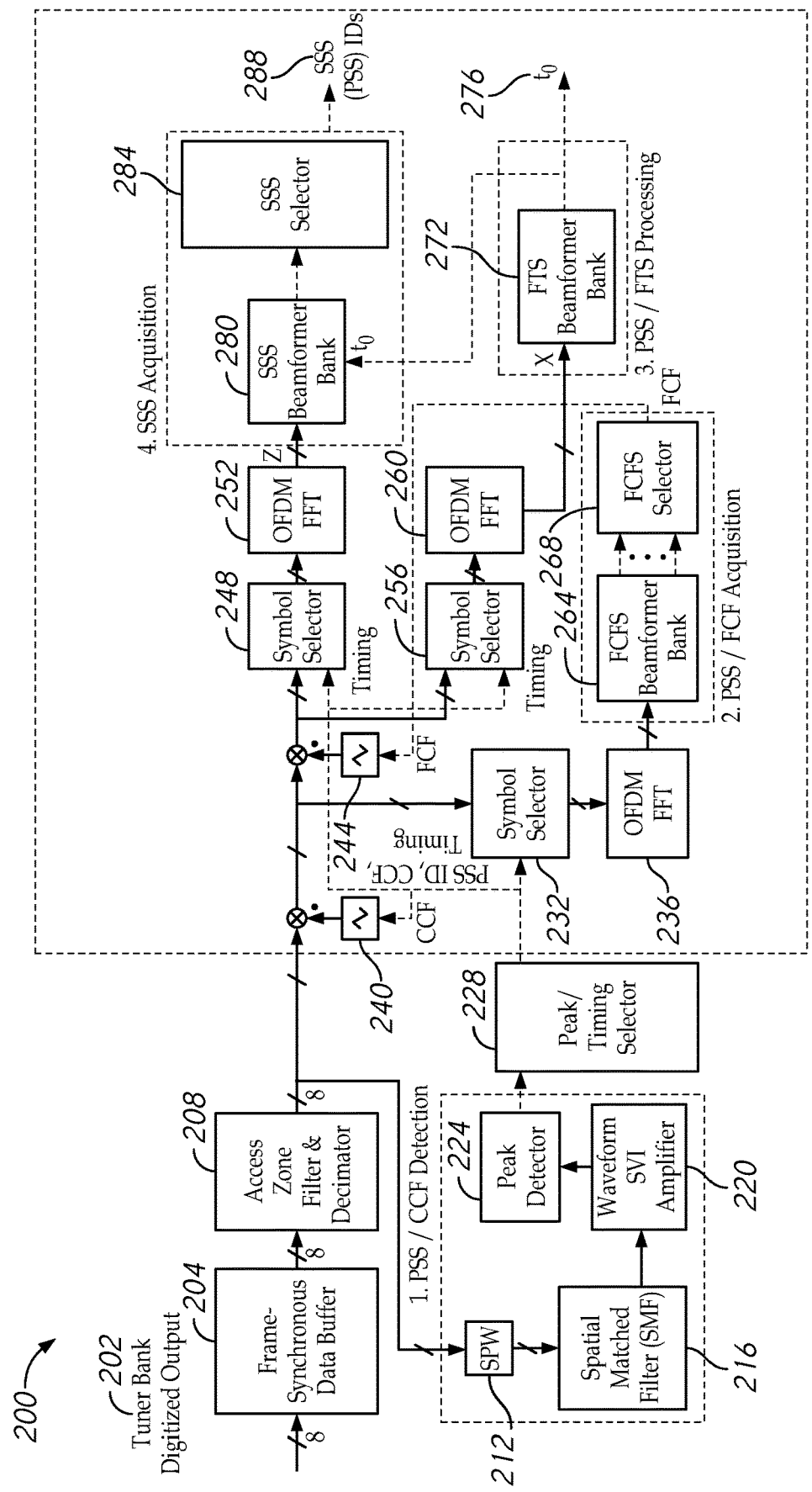
FIG. 2 is a schematic illustration of a system arranged in accordance with examples described herein.

FIG. 2 is a schematic illustration of a system 200 arranged in accordance with a preferred embodiment described herein. For example, the system 200 may be an implementation of the beamforming subsystem 104 of FIG. 1. As such, the system 200 may be referred to as a receiver (e.g., a digital receiver portion of a wireless receiver). In the example, the system 200 may represent functionalities implemented on the processor as executable instructions that are loaded onto the weight processor 104a. Such executable instructions may be stored on non-transitory computer readable media, for example, as encoded executable instructions, which, when executed by a processor (e.g. weight processor 104a), is configured to cause the RN (e.g., node 100) to perform certain operations described herein. In some examples, each element of system 200 may represent a discrete portion (e.g., memory allocation) of a processor to the corresponding functionality, such that that element of system 200 is a specially-configured hardware element that implements its corresponding functionality in accordance with the executable instructions. For example, a specific portion of the weights processor 104a may be configured to execute instructions, from an associated non-transitory computer-readable medium, that implement the spatial whitener 212 and the SMF 216. Additionally or alternatively, based on the instructions executed, the system 200 may form one or more BFNs (e.g., BFN 104b) to perform certain beamforming processes that are part of system 200. Accordingly, the system 200 may operate as a receiver for a RN of a wireless network (e.g., a WAN).

With the system 200 being implemented as a weight processor 104a, the system 200 may receive data streams from an antenna subsystem 100 as tuner bank baseband output 202. In the example shown in FIG. 2, the number of antennas may be eight, so the received data streams are eight (8) separate data streams, which may all be received at a same frequency. While the system 200 shows the number of antennas in the RN antenna array as eight, it is described more generally throughout as variable K, as there is no requirement to use eight antenna elements. Accordingly, the eight data streams of the tuner bank baseband output 202 are provided to the frame-rate synchronous data buffer 204. The frame-rate synchronous data buffer 204 stores each data stream in local memory over a common set of contiguous frame-length data snapshots (e.g., frame 1000 of FIG. 10) to process them using spatial processing in system 200. The frame-rate synchronous buffering will cause the snapshots to be offset in time from the start of the frame, due to the random startup time of the unconnected RN, but all buffered snapshots will have this same timing offset, due to the frame-rate synchronous buffering scheme.

Subsequently, the access zone filter & decimator 208 may isolate and decimate (down-sample) the data streams in the access zone (AZ) frequency region. The AZ is defined as the frequency region carrying the PSS and SSS signals, and may reside in a subband of the full signal bandwidth as a mechanism to make network discovery processing more efficient at the RNs. As used herein, decimation signifies processing to achieve a reduction in sample rate, by integer or non-integer factors depending upon the original digitizer sample rate and the desired destination sample rate. In a non-limiting numerical example, the PSS and SSS signals in the 4G LTE standard reside in sixty-two OFDM subcarriers, occupying just 62×15=0.93-MHz out of a total 20-MHz signal bandwidth. The AZ filter & decimator stage 208 isolates the PSS and SSS subband and retunes as needed to center it at nominal DC (0 Hz). In the 4G LTE example, the AZ decimated sample rate may be 1.92 Mcsps (megacomplex samples per second, e.g., $f_s$=1.92e6), chosen to allow use of a 128-sample access zone OFDM FFT, e.g., $N^{FFT\_AZ}$=128, to yield precise 15-kHz bin spacing conforming to 4G LTE standard OFDM subcarriers. Accordingly, the AZ filter & decimator 208 may be a narrowband filter configured to receive and filter each data stream as a continuous baseband signal (e.g., not stopping between snapshots) with a 0.93-MHz passband bandwidth in this 4G LTE example, and subsequently decimate each such filtered baseband stream to a lowered sample rate of 1.92 Mcsps. This processing proceeds in continuous fashion through the full set of buffered snapshots. In a typical example the amount of data buffered in this manner will span a few tens of frames, e.g., forty (40) in a preferred embodiment.

The system 200 includes a spatial whitener (SPW) 212 and a peak/timing selector 228 associated with the PSS/ coarse carrier frequency (CCF) detection; a fine carrier frequency selector (FCFS) beamformer bank 264 associated with PSS/FCFS acquisition; a fine timing selector (FTS) beamformer bank 272 associated with PSS/FTS processing; and a SSS beamformer bank 280 associated with SSS acquisition. The nomenclature PSS/FCFS and PSS/FTS generally signifies that the same PSS waveform may be exploited for both FCFS and FTS adaptive beamformer bank processing. The system 200 generates PSS and SSS IDs 288, which impart the identification numbers of cells/sectors of any BNs. The system 200 also generates timing information associated with each reported PSS and SSS ID. Such PSS and SSS IDs 288 may be utilized along with the associated timing information in downstream RN processing to derive cell/sector identification for each SSS ID (SSSID), demodulate the associated public broadcast channel (PBCH), and decode the information needed to select and synchronize to a cell/sector for network entry of the RN.

Figure 3:
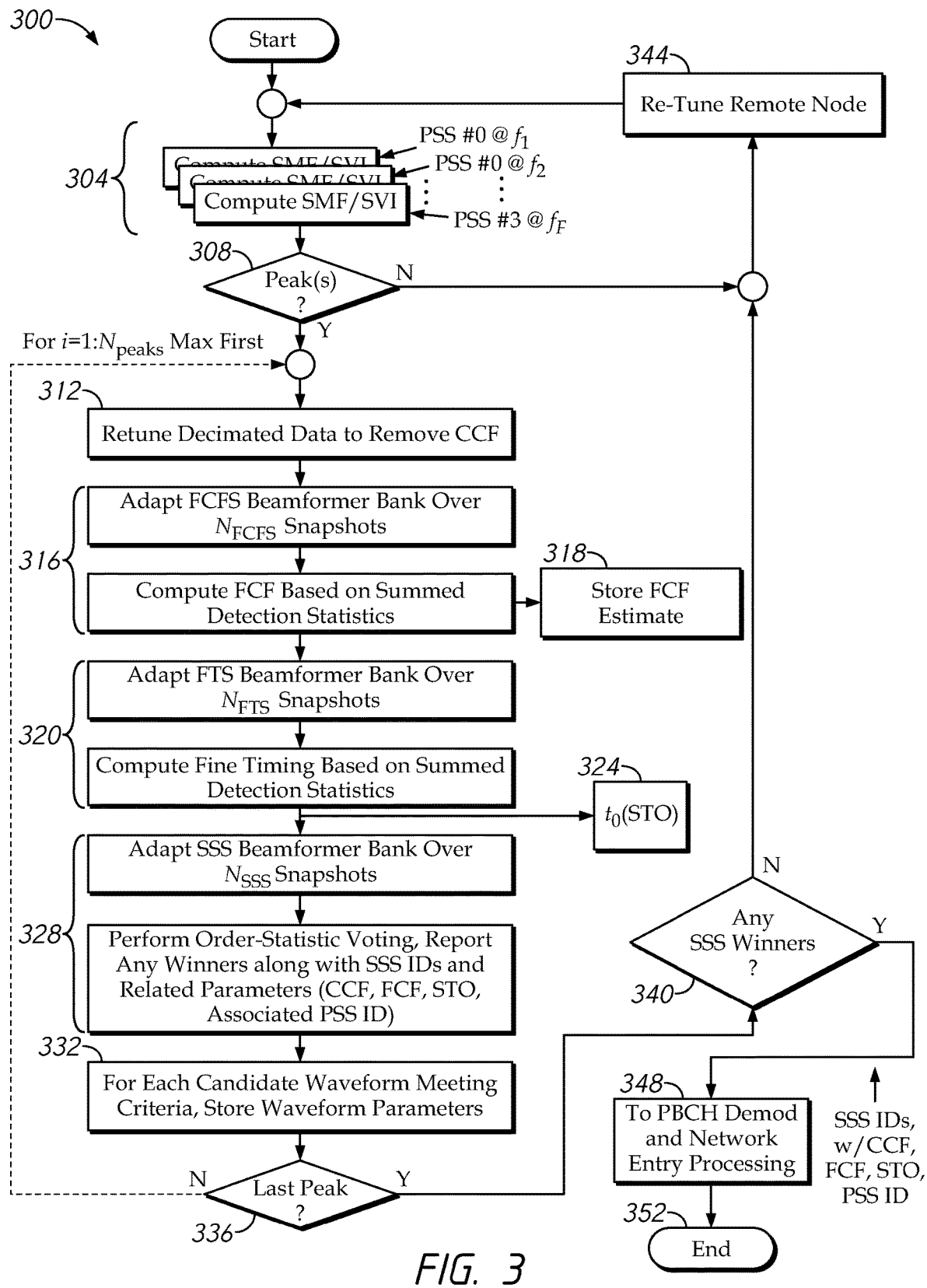
FIG. 3 is a flowchart of a method arranged in accordance with examples described herein.

FIG. 3 is a flowchart of a method 300 of processing steps utilized by a preferred embodiment at the RN, as performed by system 200 on the decimated and buffered data. The PSS/CCF detection processing occurs at step 304. At step 304, elements 212-220 perform a spatially enhanced matched-filter search of certain PSS IDs over a range of coarse carrier frequency (CCF) offsets dictated by a RN crystal tolerance. Matched filters are generated, at step 304, for each PSS ID and CCF (PSS ID/CCF) to be tested. In some examples, the numbers of PSS IDs may be three, four, five, seven, ten, or a hundred IDs. Other numbers of PSS IDs may also be used. The SMF 216 and SVI 220 generate an output waveform for each PSS ID and CCF tested. The SVI output waveform is provided to step 308.

At step 308, the method 300 may determine whether peaks are included for downstream testing, for example, at peak detector 224 of FIG. 2. If no peaks are detected for any PSS ID and CCF, the flow proceeds to step 344 (e.g., via 'N,' or NO), where the remote node is re-tuned. For example, in discovering a network, the remote node may tune to other bulk frequencies (e.g., channels of an unlicensed band) to determine whether there is a base station to which the RN may be synchronized. When no peaks are found in the output SVI waveform 220, the RN may continue searching frequency bands for a BN by re-tuning its receiving frequency, for example, by tuning one or more antennas of the RN (all antennas are retuned in a preferred embodiment). If one or more peaks are found at step 308, the flow proceeds to step 312 (e.g., via 'Y,' or YES).

Processing in method 300 following the decision diamond 308 is carried out individually for each detected PSS ID/CCF peak. In a preferred embodiment, these are stepped through one at a time in largest-to-smallest detection peak amplitude order. At step 312, the decimated and buffered data streams are mutually retuned to remove the identified CCF associated with the detected PSS ID/CCF peak currently under test.

At step 316, the FCF offset remaining after removal of the CCF is determined using a FCFS beamformer bank as described in method 700. The FCFS beamformer bank is adapted using a set of frequency-shifted versions of the PSS ID waveform under test (more precisely, for each PSS ID/waveform, signifying that each PSS ID is encoded as a unique PSS waveform), covering a search range of possible remaining FCFs. Detection statistics are computed and averaged or summed across several (Ma's in number) snapshots for each such FCF-offset beamformer in the FCFS beamformer bank. The maximum of these (or other selected one on meeting a selection criteria) is selected and interpolated using the adjacent detection statistics. Either averaging or summing of detection statistics can be employed over the Ma's snapshots with equal results in some examples, because both approaches preserve the relative relationships among detection statistics in the beamformer bank. Once the FCF has been thus computed, the FCFS frequency estimate is stored at step 318, e.g., in a local cache or a memory associated with the FCFS beamformer bank. From step 316, the flow of method 300 proceeds to step 320.

At step 320, a FTS beamformer bank is adapted across several snapshots as described in method 800, to generate a fine timing offset, to, corresponding to the PSS ID/CCF detection peak currently under test. This is reported as the sample timing offset (STO) at step 324. The FTS beamformer bank is adapted using a set of time-shifted versions of the PSS ID/waveform under test, covering a search range of fractional-sample (e.g., subsample) STOs. Detection statistics are computed and averaged or summed across several ($N_{FTS}$ in number) snapshots for each such time-offset beamformer in the FTS beamformer bank. The maximum of these (or other selected one on meeting a selection criteria) is selected and interpolated using the adjacent detection statistics in the bank. Either averaging or summing of detection statistics can be employed over the $N_{FTS}$ snapshots with equal results in some examples, because both approaches may preserve the relative relationships among detection statistics in the beamformer bank. Like the FCFS frequency estimate, the resultant STO estimate to may be stored in a local cache or a memory associated with the FTS beamformer. From step 320, the flow of method 300 proceeds to step 328.

At step 328, an SSS beamformer bank is adapted across several snapshots as described in method 900, to perform detection of multiple (e.g., all) SSS sequences present in the received data at the SSS symbol location associated with the PSS ID/CCF detection peak currently under test. The SSS beamformer bank generates a plurality of SSS training sequences which may cover the full set of SSS IDs employed by the wireless network, with training sequences pre-adjusted in fine-frequency and fine-timing to match the respective FCF and STO parameters as measured by the previous FCFS and FTS beamformer banks; these adjustments may improve and/or maximize SSS detection sensitivity. (The pre-adjustment in fine frequency may be performed in some examples only if the FCF has not been removed by digital retuning of the decimated array data streams.) Each such SSS training sequence is used to adapt a separate beamformer in the SSS beamformer bank once per snapshot over a set of $N_{SSS}$ snapshots, from which in turn detection statistics are calculated and stored for each snapshot.

When all $N_{SSS}$ snapshots have been processed by the SSS beamformer bank as above, the stored detection statistics are subjected to a statistical voting protocol, termed M-of-N voting, to ascertain which SSS sequence(s) may be present at the timing and CCF under test. This voting protocol may be implemented using a two-stage procedure. The first stage computes the order statistic for the SSS beamformer-bank detection statistics on each snapshot, selects only the top-amplitude few of these as "snapshot representatives," and sends their SSS IDs to a voting pool. The second stage computes (e.g., when all $N_{SSS}$ snapshots have been processed in this manner) a vote count for each SSS ID represented in the aggregated voting pool, compares these to a vote count threshold, and declares the above-threshold SSS IDs as being present. Multiple such SSS IDs can be expected to be detected per PSS ID/CCF detection peak if the RN is tuned to a channel occupied by a typical wireless network operating within radio reach, as emanating from multiple nearby cell and sector BNs.

The flow next proceeds to decision block 336, where the method 300 determines if the last PSS ID/CCF detection peak has been processed. If so, the flow proceeds to decision block 340. Otherwise, the flow proceeds back to step 312 until all PSS ID/CCF detection peaks have been tested for i=1:$N_{peaks}$, the maximum peak having been processed first.

At decision block 340, identified SSS IDs are reported to RN supervisory software (step 348) along with their CCF, FCF, STO, and related PSS ID. If no SSS sequences were identified, the flow of method 300 proceeds back to step 344, where the RN may be again re-tuned. For example, to discover a network, the remote node may continue to tune to various channels in a band (e.g., of an unlicensed band) to determine whether there is a BN to which the RN may be synchronized. If one or more SSS sequences were identified, step 348 embodies follow-on processing network entry processing external to example systems described herein. For example, the RN may proceed to PBCH demodulation, testing each identified SSS ID as paired with all possible PSS IDs, and watching for successful PBCH message decoding results. Each PSS ID and SSS ID pairing generates a unique BN identity (BN ID) that, if matching a received BN ID, yields successful decoding of that BN's PBCH containing essential network entry metadata. Typically, if an SSS ID is detected with high confidence, PBCH processing will make decoding attempts for all PSS ID possibilities paired with that SSS to prevent the risk of decoding failure due to using the wrong PSS ID. The likelihood of such PSS ID confusion may be high in some examples due to the use of the full defined set of (three or four) PSS IDs at most cells to identify their respective three or four sectors. Finally, at step 352, the method 300 ends.

Continuing now with reference to FIG. 2, additional details regarding various elements of FIG. 2 will be described with reference to methods 300, 600, 700, 800, and 900, as well as the system 400 which may be implemented as part of a system 200. In a preferred embodiment, the system 400 includes elements that analogously correspond to elements 202-228 of system 200. The received baseband data streams, once filtered and decimated by the AZ filter & decimator 208, are provided to two data paths: a data path for PSS/CCF detection processing, where the spatial whitener 212 receives the data streams; and a data path towards three symbol selectors 232, 256, and 248 where the data streams are additionally processed after the CCF, FCF, and FTS processing results are provided, respectively.

Figure 4:
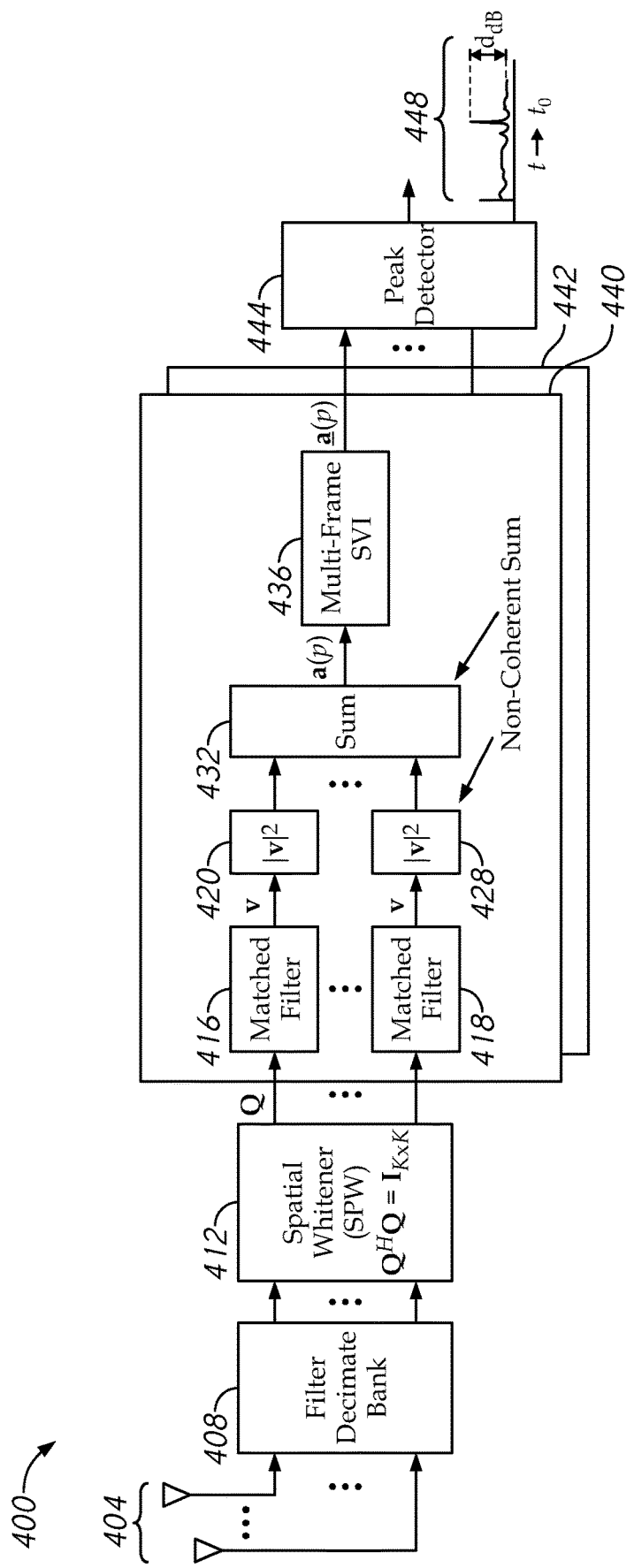
FIG. 4 is a schematic illustration of a subsystem arranged in accordance with examples described herein.

At the SPW 212, the data streams are processed so as to generate spatially whitened data streams, as described further in detail with respect to spatial whitener 412 of FIG. 4. Spatial whiteners described herein generally refer to components (e.g., hardware, software, firmware, or combinations thereof) that utilize linear transformations to compress received signal power levels into a narrower range than represented in the input data streams. In some examples, including a present preferred embodiment, spatial whitening normalizes, to the extent allowed by the arriving signal wavefront angles on the antenna array, the received signals to have the same approximate post-whitened power levels, thereby reducing the impact of unlicensed-band interference which may be received at far higher power levels than desired network signals. In some examples, including a present preferred embodiment, the output power levels of data streams output from the spatial whitener may be equal or nearly equal, e.g., falling within a range of 6 dB of one-another in a non-limiting numerical example. Moreover, the plurality of whitened data streams may be generated so as to possess an identity spatial covariance matrix of dimension K, where K is the number of antennas used by the receiver. In some examples, K may be less than the number of antennas used by the receiver. As an example, the output data streams may be derived through matrix algebra manipulation of a spatial covariance matrix, which contains information regarding relationships between the received signals, including their spatial signatures and respective power levels on the receiving antenna array. In providing such a covariance matrix, the spatial whitener is able to equalize the effective power levels of all signals impinging on the antenna array, reducing the power of strong signals (such as nearby interference) such that much weaker signals-of-interest belonging to the wireless network are unmasked and made more processable. The whitened data streams are provided by the spatial whitener 212 to the spatial matched filter (SMF) 216.

The remaining PSS/CCF detection processing stages 216, 220, and 224 are applied as a group multiple times to the SPW output, once for each PSS ID/waveform and coarse carrier frequency (CCF) to be tested. Consistent with previous nomenclature, the PSS/CCF descriptor signifies that PSS waveforms are used for these CCF and signal detection purposes. In a preferred embodiment, a separate SMF 216 is computed for each of four PSS ID/waveform variants employed by the network, for each CCF to be tested. In this embodiment, a maximum of 5 such CCF values are tested, spanning a carrier frequency uncertainty range dictated by RN crystal oscillator tolerances. In other applications the number of CCF values required to span the uncertainty range may be different. These CCF values are tested inside a CCF search loop that tests all PSS waveforms against the most likely CCF value first (e.g., based on past RN operating history in the intended network) and allows for early termination upon detection success. For each such test, the SMF 216 operates on the whitened data streams as input (e.g., as a whitened matrix as described with respect to SMF 416, 418 of FIG. 4). The SMF 216 generates from each such whitened stream a matched-filter data stream, where the matched filter employs the PSS ID/waveform currently under test, tuned in frequency to the current CCF under test. For example, the SMF 216 may have an impulse response designed to detect the PSS ID/waveform currently under test. The SMF 216 may accordingly provide filtered data streams including indicators of the presence of the PSS ID/waveform currently under test. The indicators may be, for example, peaks, dips, or other signal variations. The SMF 216 calculates a non-coherent sum or average (e.g., of magnitudes or magnitudes-squared) across these filtered data streams to generate a single, combined SMF intermediate waveform for the PSS ID and CCF value under test. The SMF 216 then amplitude normalizes the combined SMF waveform using a finite impulse response (FIR) filter. The SMF 216 provides this SMF output waveform to the waveform synchronous video integrated (SVI) amplifier 220.

Continuing with the current PSS ID/waveform and CCF value under test, the SVI amplifier 220 may sum, average, or otherwise combine the SMF output waveform over multiple frame-synchronous snapshots, to reinforce frame-synchronous PSS detection peaks and thereby generate a noise-reduced SVI output. Summing is employed in a preferred embodiment detailed herein. The waveform SVI amplifier 220 provides the SVI output to a peak detector 224, which detects PSS ID/CCF peaks in the amplified waveform and, in turn, provides their detected locations (e.g., peak coarse timing), along with the detected peak magnitude and the current search-loop PSS ID and CCF value, to the peak/timing selector 228. In some examples, as more frame-synchronous snapshots of the SMF output waveform are processed by the SVI amplifier 220, the precision of the SVI amplifier 220 may increase until it approaches a physical limit for discriminating differences between peaks and associated timings. This limit relates primarily to peak timing drift, resulting in peak broadening and smearing due to RN timing drift relative to the local wireless network, arising from RN clock hardware/crystal tolerances not yet compensated at this pre-synchronization stage of operation (but ultimately corrected when network synchronization is complete).

To determine the remaining characteristics and parameters of the detected PSS signals, and to subsequently detect the SSS signals associated with them, various beamformer banks are utilized by system 200, such as the FCFS beamformer bank 264 associated with PSS/FCF acquisition, the FTS beamformer bank 272 associated with PSS/FTS processing, and a SSS beamformer bank 280 associated with SSS acquisition. To begin that process, peak detector 224 provides detected peaks and associated feature vectors (coarse timing, PSS ID, and CCF) to the peak/timing selector 228.

It should be noted that at this point the peak detector 224 may have eliminated all but one CCF for nearly any currently deployed wireless WAN network, owing to the near-universal adoption of synchronous operation among all BNs in such networks. Within that single CCF there can be several PSS peaks for each PSS ID/waveform, corresponding to different cells and sectors. For example, four PSS IDs may be utilized by a network in a per-cell reuse pattern to designate each of four sectors on each cell. As a consequence, all four PSS IDs will likely yield detection peaks, and in fact each individual PSS ID can be expected to generate multiple peaks at various coarse timings, corresponding to propagation delays in arriving at the RN array from different cells at various distances. It should also be noted that none of the processing of a present preferred embodiment limits CCF detection to a single CCF value, as the CCF search loop can be configured to prohibit early termination in order to support the general case of multiple CCF values, as might occur in an unsynchronized network.

The order of processing going forward is described with cross-references to method 300 of FIG. 3. The peak/timing selector 228 is represented therein as decision diamond 308 along with the outer loop immediately following it. The peak/timing selector 228 steps through all detected PSS ID/CCF peaks, typically in order starting from the largest peak amplitude and working downward until hitting a programmable peak-count limit. Each PSS ID/CCF detection peak may be provided one at a time, along with its associated feature vector (PSS ID, CCF value, coarse timing, e.g., location in the snapshot) to downstream processing, as shown in the large dashed box in FIG. 2.

Continuing with the retuning step (flow chart box 312), the K decimated data streams proceed from the AZ filter & decimator 208 to a digital tuner 240 that mutually retunes the data streams to remove the detected CCF and center them in the digital baseband. Using the coarse timing information associated with the PSS ID/CCF detection peak under test, as provided by the peak/timing selector 228, symbol selector 232 then selects the time-interval within the K data streams containing the PSS ID/waveform under test. The terminology "symbol selector" is used here to conform with prominent wireless standards that refer to their PSS and SSS signals as symbols, signifying that their waveforms are generated as OFDM symbols.

PSS/FCF acquisition processing (method 300 flow chart boxes 316) occurs next, utilizing the FCFS beamformer bank to determine fine carrier frequency offset for the current PSS ID/CCF detection peak under test. FCFS beamformer bank processing is carried out on each snapshot of a set of $N_{FCFS}$ snapshots. At the OFDM FFT 236, the selected time-domain snapshot samples in each data stream are converted to the frequency-domain using the OFDM FFT, yielding the received PSS ID/waveform in each stream as its equivalent OFDM PSS sequence, as contaminated by noise, interference, multipath distortion, and additional distortion due to the as-yet uncorrected FCF and fine timing offsets. In other embodiments the OFDM FFT can be omitted and all FCFS beamformer bank processing can instead be performed on the equivalent received time-domain samples from symbol selector 232.

As described with reference to method 700, the FCFS beamformer bank 264 generates a set of fine-frequency-shifted PSS training sequences from the PSS ID/waveform currently under test, spanning the FCF frequency search range remaining after the earlier removal of the CCF. These are generated as frequency-domain samples in a preferred frequency-domain embodiment. For each such frequency-shifted training sequence, the respective adaptive beamformer within the FCFS beamformer bank 264 calculates weights for the current snapshot. From these weights, each beamformer in the bank also computes a detection statistic, reflecting the strength and match of the received PSS ID/waveform to the respective frequency-shifted training sequence. These detection statistics are averaged or summed, or otherwise combined, across the set of $N_{FCFS}$ snapshots for each such FCF-offset beamformer in the FCFS beamformer bank.

The FCFS selector 268 selects the maximum (or other selected one) of the above summed or averaged or otherwise combined detection statistics, and performs an interpolation to yield a FCF estimate with finer resolution than the raw frequency granularity of the FCFS beamformer bank. The resultant FCF is identified and provided by the FCFS selector 268 to the digital tuner 244. Accordingly, the received data streams, having already been retuned by digital tuner 240 to remove the identified CCF offset, are now mutually fine-tuned by the digital tuner 244 to remove the remaining FCF offset.

Alternative embodiments may forego the above retuning step and instead fine-tune all ensuing beamformer bank PSS ID/waveform and SSS ID/waveform templates to match the FCF offset determined above by the FCFS selector 268.

Continuing in the processing flow (e.g., as described with reference to method 300 of FIG. 3, box 320), an example next proceeds to PSS/FTS processing, utilizing the FTS beamformer bank 272 to determine the fine-timing offset, e.g., to 276, of the received PSS ID/waveform. FTS beamformer bank processing is carried out on each snapshot in a set of $N_{FTS}$ snapshots, using the retuned data streams having now had the CCF and FCF frequency offsets removed. Again using the coarse timing information associated with the PSS ID/CCF detection peak under test, symbol selector 256 selects the time-interval containing the PSS ID/waveform under test, e.g., the same time-interval as selected previously for FCFS processing by symbol selector 232. At the OFDM FFT 260, the selected time-domain samples are converted to the frequency-domain in a preferred frequency-domain embodiment.

As described with reference to method 800, the FTS beamformer bank 272 generates a set of fine-time-shifted PSS training sequences from the PSS ID/waveform currently under test, spanning in a preferred embodiment a three time-sample range centered on the peak coarse-timing in half-sample steps. These are provided to the FTS beamformer bank (272) as either frequency-domain samples (for a preferred OFDM embodiment) or time-domain samples (for alternative time-domain embodiments). In the frequency-domain implementation of a preferred embodiment the time-shifts are implemented by multiplying FFT bins of the frequency-domain PSS training sequence by phase ramps of appropriate slope.

For each such time-shifted training sequence, the respective adaptive beamformer within the FTS beamformer bank 272 calculates weights on each snapshot. From these weights, each beamformer in the bank also computes a detection statistic, reflecting the strength and match of the received PSS ID/waveform to the respective, time-shifted PSS training sequence. These detection statistics are averaged or summed or otherwise combined across the set of $N_{FTS}$ snapshots for each such fine time-offset beamformer in the FTS beamformer bank. The maximum of these (or other selected one based on a selection criteria) is then selected and interpolated with the neighboring values to produce the fine sample-timing offset (STO) estimate to 276 with finer resolution than the raw time granularity of the FTS beamformer bank. This STO is then provided to the SSS beamformer bank 280 and provided as an output parameter to downstream RN processing.

Continuing in the processing flow (e.g., as described with reference to method 300 of FIG. 3, box 328), the present embodiment next proceeds to SSS acquisition processing, utilizing the SSS beamformer bank 280 to determine any and all SSS sequences present at the SSS symbol location complementary to the location of the PSS ID/CCF peak under test. Still with reference to the example system 200 of FIG. 2, the retuned data streams, already having been mixed by digital tuner 240 to remove the identified CCF and by digital tuner 244 to remove the identified FCF, are provided to the symbol selector 248 and OFDM FFT 252. Using the coarse timing information associated with the PSS ID/CCF detection peak under test, symbol selector 248 selects the time-interval containing the associated SSS signal, residing at the SSS location precisely corresponding to that of the PSS (e.g., removed by 2 OFDM symbols in the case of 4G LTE). At the OFDM FFT 252, the selected time-domain samples are converted to the frequency-domain in a preferred frequency-domain embodiment.

As described with reference to method 900, the SSS beamformer bank 280 generates a plurality of SSS waveforms to be used as beamformer training sequences covering SSS IDs employed by the wireless network, with all such training sequences pre-adjusted in fine-timing to match the STO to 276 as measured by the previous FTS beamformer banks. Accordingly, in a preferred frequency-domain embodiment SSS training sequences are computed in the frequency-domain, and phase ramped at the identified STO to 276 using the same FFT bin multiplication procedure as used in the FTS beamformer bank to generate any one of the FTS sample timing delays.

For each such phase-ramped SSS training sequence, the related beamformer in the SSS beamformer bank 280 calculates weights based on respective frequency-domain symbols. From these weights, each beamformer in the bank also computes a detection statistic, reflecting the strength and match of any and all received SSS ID/waveforms to its respective member of the full set of SSS ID/waveforms in use by the network. In this manner, a respective beamformer may be formed for each hypothesis of a multiple hypothesis test (MHT), where in this instance the MHT is a non-exclusive MHT that is able and allowed to detect more than one hypothesis satisfied (e.g., multiple SSSs present). The full set of detection statistics are computed and stored in temporary memory for each in a set of $N_{SSS}$ snapshots.

When all $N_{SSS}$ snapshots have been processed by the SSS beamformer bank as above, the SSS selector 284 subjects the stored detection statistics to a statistical voting protocol, termed M-of-N voting, to ascertain which SSS sequence(s) may be present at the timing and CCF under test. This voting protocol may be implemented using a two-stage procedure. The first stage computes the order statistic for the SSS beamformer-bank detection statistics on each snapshot, selects only the top-amplitude few (or other selection statistic group) of these as "snapshot representatives," and sends their SSS IDs to a voting pool. When the $N_{SSS}$ snapshots have been processed in this manner, the second stage of the SSS selector 284 then computes a vote count for each SSS ID represented in the voting pool, compares these to a vote count threshold, and declares the above-threshold SSS IDs as being present. Multiple such SSS IDs can be expected to be detected per PSS ID/CCF detection peak if the RN is tuned to a channel occupied by a typical wireless network operating within radio reach, as emanating from multiple nearby cell and sector BNs. The SSS ID(s) 288 so determined are provided as output of system 200, along with associated PSS IDs for each SSS ID(s). In generating such PSS and SSS IDs, the system 200 may identify a list of BNs to which the RN may synchronize for wireless communication.

FIG. 4 is a schematic illustration of a system 400 arranged in accordance with a preferred embodiment, and includes elements that analogously correspond to elements 202-228 of system 200. For example, system 400 performs the PSS/CCF detection processing occurring at step 304, where elements 212-220 perform a spatially enhanced matched-filter search of certain PSS IDs over a range of coarse carrier frequency (CCF) offsets.

For best results in some examples PSS/CCF detection processing may be performed in sub-snapshots smaller than the prescribed nominal snapshot, in order to minimize and/or reduce sensitivity losses (e.g., overtaxing of spatial discrimination degrees-of-freedom) that can result when snapshots happen to span both uplink and downlink sub-frames. For example, a time-domain portion of the frame 1000 may be a sub-snapshot. A preferred embodiment includes a modest number of such sub-snapshots (e.g., six) and includes sub-snapshot overlapping and masking of end-effects. This ensures contiguous coverage of all possible PSS orientations within and between sub-snapshots, including extreme snapshot-edge orientations.

System 400 represents PSS/CCF detection processing for a single sub-snapshot. Other sub-snapshots are identically processed such that together all sub-snapshot processors span the full frame-length snapshot. System 400 includes K antennas 404 that provide data streams to filter decimate bank 408. Filter decimate bank 408 corresponds analogously to the AZ filter & decimator 208 of FIG. 2. Therefore, the filter decimate bank provides the filtered and decimated sub-snapshot data streams to the SPW 412. With reference to the analogous elements of FIG. 2, for a sub-snapshot of the K data streams that is processed by a SPW 212 and SMF 216, which may be referred to as a sub-snapshot, a sub-snapshot processor executes once per snapshot and accumulates its output in the waveform SVI amplifier 220 over $M_{SVI}$ contiguous snapshots.

Accordingly, in the context of FIG. 4, the SPW 412 computes a sub-snapshot whitened data matrix Q ($N_{subsnap} \times$ K) as $$Q = XR^{-1} \tag{1}$$

where X is the $N_{subsnap} \times K$ input sub-snapshot data matrix, and R (K×K) is the upper triangular cholesky factor of a further decimated sub-snapshot data spatial covariance matrix, given by $$R = \sqrt{\frac{N_{subsnap}}{N_{chol}}} \times chol(\breve{X}^H \breve{X}), \tag{2}$$

where $\breve{X}$ is the further-decimated sub-snapshot array data, generated by subjecting the input data X to an additional decimation by factor $\Delta$, $$\breve{X} = [\breve{x}_{i,k}] : \breve{x}_{i,k} = x_{i\Delta,k}, i = 0, \ldots, N_{chol}-1, k=0, \ldots, K-1. \tag{3}$$

where $$N_{chol} = \lfloor N_{subsnap}/\Delta \rfloor. \tag{4}$$

and where $\lfloor \cdot \rfloor$ in (4) signifies the "floor" function. This extra decimation is optional to reduce computational loading; and, if utilized, A may be selected to yield not fewer than 4K samples for spatial whitening. The normalization scale factor based on $N_{subsnap}$ and $N_{chol}$ in (2) is included to generate a unit-normalized SPW output noise/interference floor. Therefore, the spatial whitener (SPW) 412 may be configured to calculate the plurality of whitened data streams using a linear transformation of the plurality of input data streams, such that the plurality of whitened data streams possesses an identity spatial covariance matrix of dimension K, where K is the number of input data streams, or a number less than the number of input data streams. Similarly, as in a preferred embodiment detailed herein, the spatial whitener (SPW) 412 may be configured to calculate a plurality of whitened data streams using a linear transformation generated from time-decimated (e.g., down-sampled) versions of the plurality of input data streams, such that the plurality of equivalently-decimated whitened data streams possesses an identity spatial covariance matrix of dimension K, but the plurality of (non-decimated) whitened data streams does not possess an identity covariance matrix, but still benefits from a compression of received signal power levels into a narrower range than represented in the input data streams.

Continuing with reference to FIG. 4, after spatial whitening each PSS ID/CCF may be processed by a different, parallel processor (e.g., 440, 442). For example, each of 440, 442 may represent SMF and SVI processing for a specific PSS ID/waveform and CCF offset. In the 4G LTE example, the PSS occupies sixty-two (62) OFDM subcarriers. Accordingly, for a PSS sequence with PSS ID i, define all sequence vectors and data matrices, as spanning in ascending frequency order, the 62 active subcarriers (OFDM FFT bins) of the AZ occupied by the PSS, whose Zadoff-Chu (ZC) sequence $S_{PSS}(i)$ is defined as $$S_{PSS}(i)=[S_{PSS,0}S_{PSS,1} \ldots S_{PSS,01}]_i^T, i=0,1,2,3. \quad (5)$$

For example, the first-half elements (31 elements) of $S_{PSS}(i)$ may be defined to span the negative-frequency subcarriers of the AZ, with element 0 starting at the negative-most PSS subcarrier, and the second-half 31 elements to span the positive frequency subcarriers, after skipping over the DC bin. The DC bin is excluded from all AZ transmission and reception. Accordingly, a different SMF-detected PSS ZC sequence may be tested to detect whether that specific PSS ZC sequence is found in the filtered, whitened data stream in the current sub-snapshot.

Next, define a set of frequency-offset versions of each of the above PSS templates, to be used to accomplish CCF search. Variable p may be defined to range over all combinations of PSS ID and CCF as $$p_{ij} \equiv (PSS\ ID=i, CCF=j \times 15\ kHz);\ i= 0,1,2,3;\ j=-3,\ldots,3. \quad (6)$$

The set of CCF frequency-shifted PSS templates $s_{PSS(p_{ij})}$ is generated by bin-shifting in the OFDM FFT as $S_{PSS}(p_{ij})$=Shift FFT Bins $[S_{PSS}(i)$, by j frequency bins up (j>0) or down (j<0)]. (7) Equation (7) imposes no bin shift for j=0. To simplify notation in the equations, the i and j subscripts associated with p may be dropped.

The spatial matched-filter (SMF) 416, 418 for each PSS ID and CCF is computed by performing a matched filter operation on each column of the Q matrix defined in (1), producing an $N_{subsnap} \times K$ output matched-filter matrix V as (temporarily dropping the PSS/CCF identifier p)

$$V=[v_0 v_1 \ldots v_{K-1}] \quad (8)$$

where $$v_k = q_k * h_{PSS}, \quad (9)$$

where $q_k$ is the kth column of Q, '*' denotes convolution, and $h_{PSS}$ is the PSS/CCF time-domain waveform matched filter impulse response $h_{PSS}$ vector, $$h_{PSS}=[h_{PSS,t}]: h_{PSS,t}=\gamma^*_{PSS}(N_{FFT\_AZ}-t),\ t=1,\Lambda, N_{FFT\_AZ} \quad (10)$$

where $N_{FFT\_AZ}$ is the size of the AZ OFDM FFT (128 samples in this example), and $\gamma_{PSS}(t)$ are elements of vector $\gamma_{PSS}$, produced by the $N_{FFT\_AZ}$-point IFFT (inverse FFT) of the PSS/CCF symbol (7), with normalization, as $$\gamma_{PSS}=[\gamma_{PSS,t}]:\gamma_{PSS,t}=\frac{v_{PSS,t}}{\sum_{i=1}^{N_{FFT\_AZ}}|v_{PSS,i}|},\ t=1,\Lambda, N_{FFT\_AZ} \quad (11)$$

where $$v_{PSS}=IFFT\{S_{PSS}(p)\}. \quad (12)$$

The matched-filter convolution operation in (9) should be implemented in the frequency domain for computational efficiency. At vector amplitude elements 420, 428 and vector summing element 432, a non-coherent sum of the result of equation (12) is computed. Accordingly, the $N_{subsnap}$-sample power-domain raw detection waveform, vector ã(p) for PSS ID/CCF combination p, is computed as $$\tilde{a}(p) = \sum_{k=0}^{K-1} v_k \circ v_k^* \quad (13)$$

where "∘" signifies an element-by-element product (e.g., the Hadamard product).

Additionally or alternatively, at the vector summing element 432, the SMF output waveform (13) may be amplitude normalized. For example, a smoothed SMF output waveform may be generated using a smoothing filter $h_{norm}$ based on the amplitudes of the PSS matched filter taps, $$\bar{a}(p)=\tilde{a}(p)*h_{norm} \quad (14)$$

where $$h_{norm}=[h_{norm,i}]:h_{norm,i}=|h_{PSS,i}|,\ i=1,\Lambda, N_{FFT\_AZ}. \quad (15)$$

and '*' denotes convolution. Using (13) and (14), the normalized SMF output waveform may be computed as $$a(p) = [a_i(p)]:a_i(p) = \frac{\tilde{a}_i(p)}{\bar{a}_i(p)},\ i=0,\ldots,N_{subsnap}-1. \quad (16)$$

At the multi-frame SVI 436, for each of the SMF outputs a(p) in (16), a separate synchronous video integration (SVI) is maintained and averaged across $M_{SVI}$ frames, yielding respective $N_{subsnap} \times 1$ averaged detection waveform vectors $\underline{a}(p)$, $$\underline{a}(p) = \frac{1}{M_{SVI}} \sum_{l=1}^{M_{SVI}} a(p)_l, \quad (17)$$

where the underscore denotes vector averaging, and l is the snapshot (frame) index. In some implementations, SVI averaging reduces noise chatter in the noise-plus-interference floor in the SMF output, increasing the deflection (hence detectability) of valid PSS peaks. Equation (17) serves as input to PSS peak detection.

Figure 5:
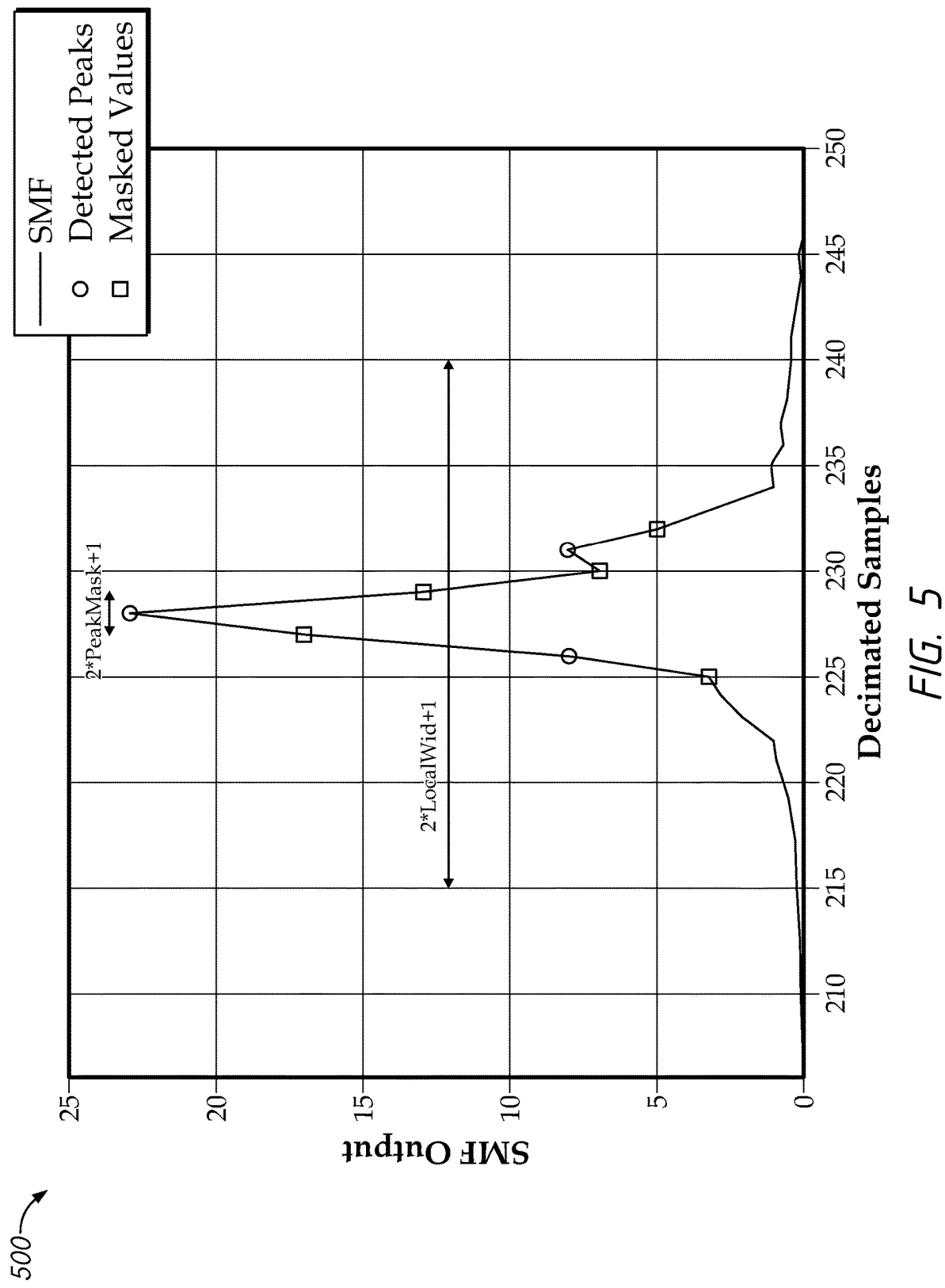
FIG. 5 illustrates an output waveform over illustrative samples.

At peak detector 444, peak detection is performed over the set of SVI waveforms for all PSSIDs, CCFs, and sub-snapshots in strongest-to-weakest order. SVI peak detection imparts the presence of each PSS signal received at the RN location, along with its CCF and nominal timing. Such peak detection may be analogous to the peak detector 224 of FIG. 2. Such a peak detector may employ a method to detect the peaks generated by the SMFs. In such a method, a peak detector 224 may zero out the edges to avoid multiple detects for each sub-snapshot and construct the received data matrix Z of size (sub-snapshot samples for each PSS ID) for a particular sub-snapshot. In that particular sub-snapshot, identify the maximum value within the sub-snapshot and store its timing location. Continuing in that particular sub-snapshot, zero out a number of samples, peakMask, to the left and right of the peak to avoid multiple detects of the same peak due to the width of the peak, and select that peak based on the desired peak resolution separation, until a number of peaks, Npeaks, have been identified in that particular sub-snapshot. Continuing in that particular sub-snapshot, replace the zeroed samples with a local mean. For example, compute a local mean using localWid samples to the left and right of the first peak location (excluding the zero samples), and replace zeroed samples within that region with the local mean. This may be repeated for all peaks and any local means. Once this has been repeated for all sub-snapshots, the method of peak detection at the peak detector 224 may continue by subtracting modified matched filter outputs from other PSS correlation signals. This step removes any overall signal level differences over the sub-snapshot duration. Additionally, a peak deflection metric may be computed. For example, a quartile deflection metric expressed as: (peakVal-Median)/StdIqr, where Median denotes the median of the sub-snapshot and StdIqr denotes the inter-quartile-range (qupper−qlower) where qupper=0.75 and qlower=0.25 are typical but not required values. Another peak deflection metric may be expressed as (peakVal-LocalMean)/LocalStd, where LocalStd refers to the standard deviation of the sub-snapshot. FIG. 5 illustrates the SMF output waveform 500 over illustrative decimated samples. As depicted, the detected peaks of the SVI peak detection span a certain length of the SMF output (e.g., 2*LocalWid+1). For example, with reference to FIG. 4 again, a maximum peak may be the peak 448.

Figure 6:
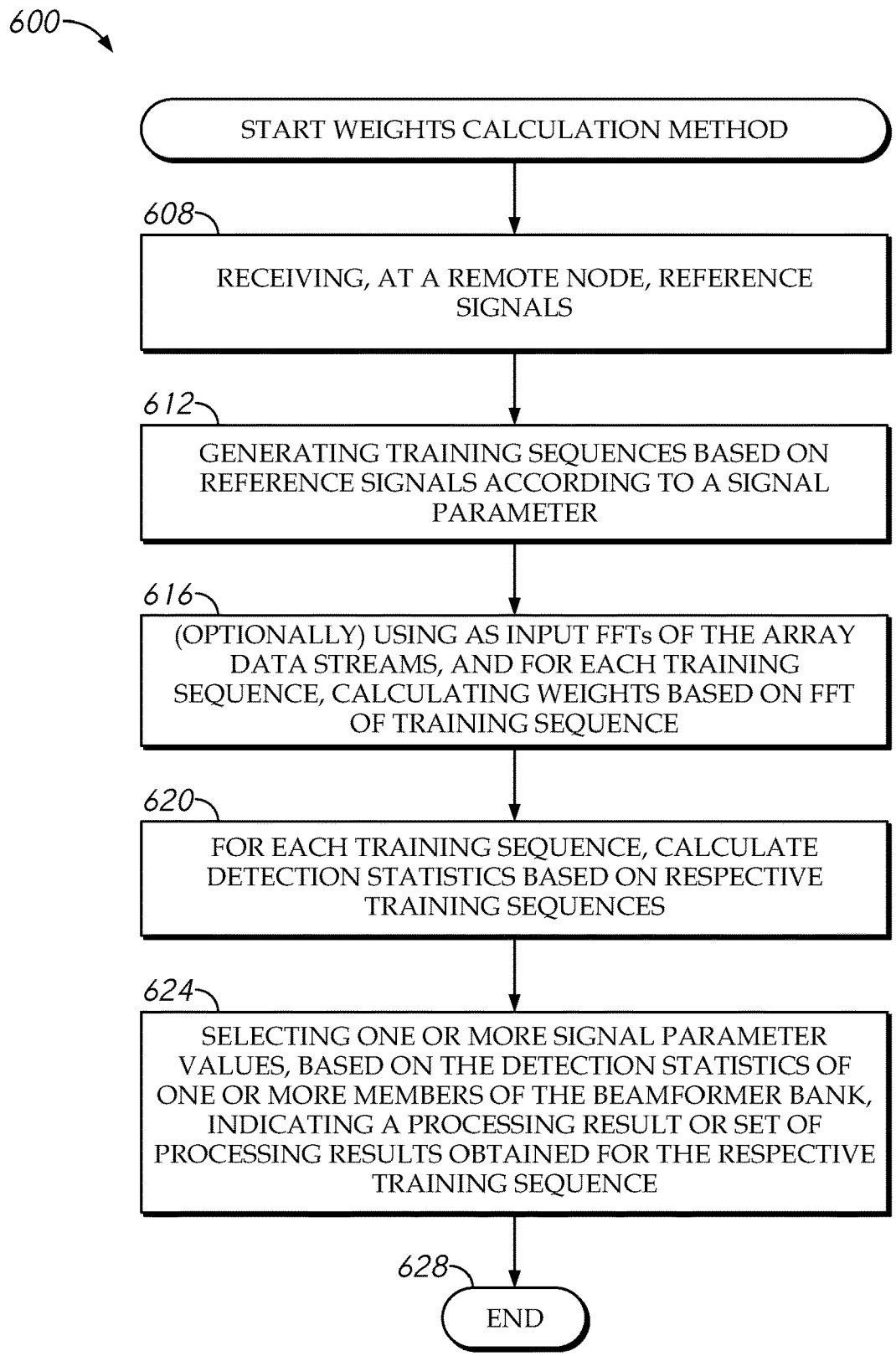
FIGS. 6-9 are flowcharts of respective methods arranged in accordance with examples described herein.

FIG. 6 is a flowchart of an adaptive beamforming weights calculation method 600 arranged in accordance with examples described herein. In the example of remote node 100, the method 600 may represent a method implemented on a processor as executable instructions. For example, the method 600 may represent instructions that are loaded onto the weight processor 104a. Such executable instructions may be stored on non-transitory computer readable media, for example, as encoded executable instructions, which, when executed by a processor (e.g. weight processor 104a), is configured to cause the remote node (e.g., node 100) to perform certain operations described herein.

The method 600 may include a block 608 that recites "receiving, at an array-based remote node, reference signals." Reference signal herein generally refers to any form of identification or synchronization signal, preamble, midamble, pilot signal or sequence, equalizer training signal or sequence, or any other deterministic waveform transmitted within a wireless communication network, whether at BN nodes or RN nodes for supervisory, control, equalization, continuity, synchronization, and/or reference purposes. An operation or process being performed by a remote node, such as node 100 with weight processor 104a, may receive reference signals in a wireless communication(s). For example, a base node broadcasts such reference signals for reception at various remote nodes, including remote node 100, to advertise that the base node is available for synchronization, network discovery, and network entry by remote nodes 190.

Block 608 may be followed by block 612 that recites "generating training sequences based on reference signals according to a signal parameter." Continuing in the example, the weight processor 104a may form beams at an adaptive beamformer receiving such reference signals. To form the beams, the weight processor 104a may implement an adaptive beamformer according to a signal nuisance parameter such as a frequency offset or timing offset, or according to a network configuration parameter such as an identification number, a pilot code group number, or a pilot code cyclic shift. For example, as described below with reference to methods 700, 800, and 900, a signal parameter may represent a frequency offset, a timing offset, or a deterministic waveform or symbol sequence, respectively. As an example of the latter, in the 4G LTE wireless standard the set of 168 unique SSS synchronization signals are generated in OFDM format from 168 different symbol sequences derived from Zadoff-Chu codes, which sequences are subsequently applied to an inverse FFT to yield the corresponding set of 168 deterministic time-domain SSS waveforms. Hence, as used herein, there is an equivalency between symbol sequences and deterministic waveforms. Accordingly, training sequences may be generated in various pluralities in accordance with a search range of such timing offsets, frequency offsets, or symbol sequences. In such cases, instructions that have been loaded onto weight processor 104a may be executed such that the training sequences are generated according to that specific signal parameter based on the received reference signals. In some examples, a beamformer bank (e.g., beamformer bank 104b of FIG. 1A or any beamformer bank of FIG. 2) may process each signal parameter at each adaptive beamformer in the beamformer bank sequentially (e.g., stepping through each adaptive beamformer). However, such processing may also occur in parallel, and leverage the same inverse covariance matrix of the array data at each adaptive beamformer to calculate the weights in parallel with respect to a respective cross correlation vector for each particular beamformer in the beamformer bank.

Block 612 may be followed by block 616 that recites "(optional) using as input FFTs of the array data streams, and for each training sequence, calculating weights based on FFT of training sequence." For example, the weight processor 104a may utilize, as input data streams from the antenna array, outputs of OFDM FFT 236, 260, and 252, respectively. In generating the training sequences, the weight processor 104a may utilize an FFT representation of the training sequences. The use of FFTs on the array data streams and the training sequence(s) produces what is termed a frequency-domain beamformer. Alternatively, the FFTs can be omitted and data streams and training sequences can be left in the time-domain. Resultant beamformer weights and related results for these respective frequency-domain and time-domain adaptive beamformer implementation may be identical, so the choice of domain may be left strictly for convenience, processing domain consistency with other aspects of processing (e.g., as related to the type of wireless network involved), or other preferences. The weight processor 104a may calculate weights based on respective cross correlation vectors of the input data streams with a training sequence, premultiplied by the inverse spatial covariance matrix of the input data streams, yielding weights reflective of the training sequence signal parameter. As stated, frequency-domain and time-domain processing may yield identical such cross correlation vectors and inverse covariance matrices. For example, as described below with respect to steps 716, 816, and 916 of methods 700, 800, and 900, respectively, weights may be calculated based on training sequences representing various carrier frequency offsets, timing offsets, and SSS symbol sequences, respectively.

Block 616 may be followed by block 620 that recites "for each training sequence, calculating detection statistics based on respective weights." Once weights have been calculated, the weights of each beam may be evaluated according to detection statistics. Accordingly, detections statistics are calculated, at each beam, which indicate a performance of the calculated weights on the received reference signals and their related signal parameters. For example, as described below with respect to steps 720, 820, and 920 of methods 700, 800, and 900, respectively, detection statistics (Dstats) are calculated based the output of the weights calculated with respect to each training sequence (and associated signal parameters) used.

Block 620 may be followed by block 624 that recites "selecting one or more signal parameter values, based on the detection statistics of one or more members of the beamformer bank, indicating a processing result or set of processing results obtained for the respective training sequence." The detection statistics may be evaluated according to various criteria (e.g., a maximum of the statistics summed over several snapshots) that may indicate one processing result, or a set of processing results (e.g., votes accumulated from top several per-snapshot detection statistics over several snapshots). For example, as described below with respect to steps 728, 828, and 928 of methods 700, 800, and 900, respectively, processing results or sets of processing results, as represented by detection statistics according to various criteria, are utilized to select a "winning" signal parameter value or set of signal parameter values, among those represented by the various training sequences used in training the beamformer bank. Block 624 may be followed by block 628 that ends the method 600.

In performing the weights calculation method 600, a processor implementing that method may improve the speed and reduce the processing burden of performing such operations. Because an inverse covariance matrix of the input data streams is utilized in common by each adaptive beamformer of the beamformer bank, this calculation, which represents the bulk of the adaptive beamformer weights calculation, need be performed only one time per snapshot for the entire beamformer bank in some examples.

Figure 7:
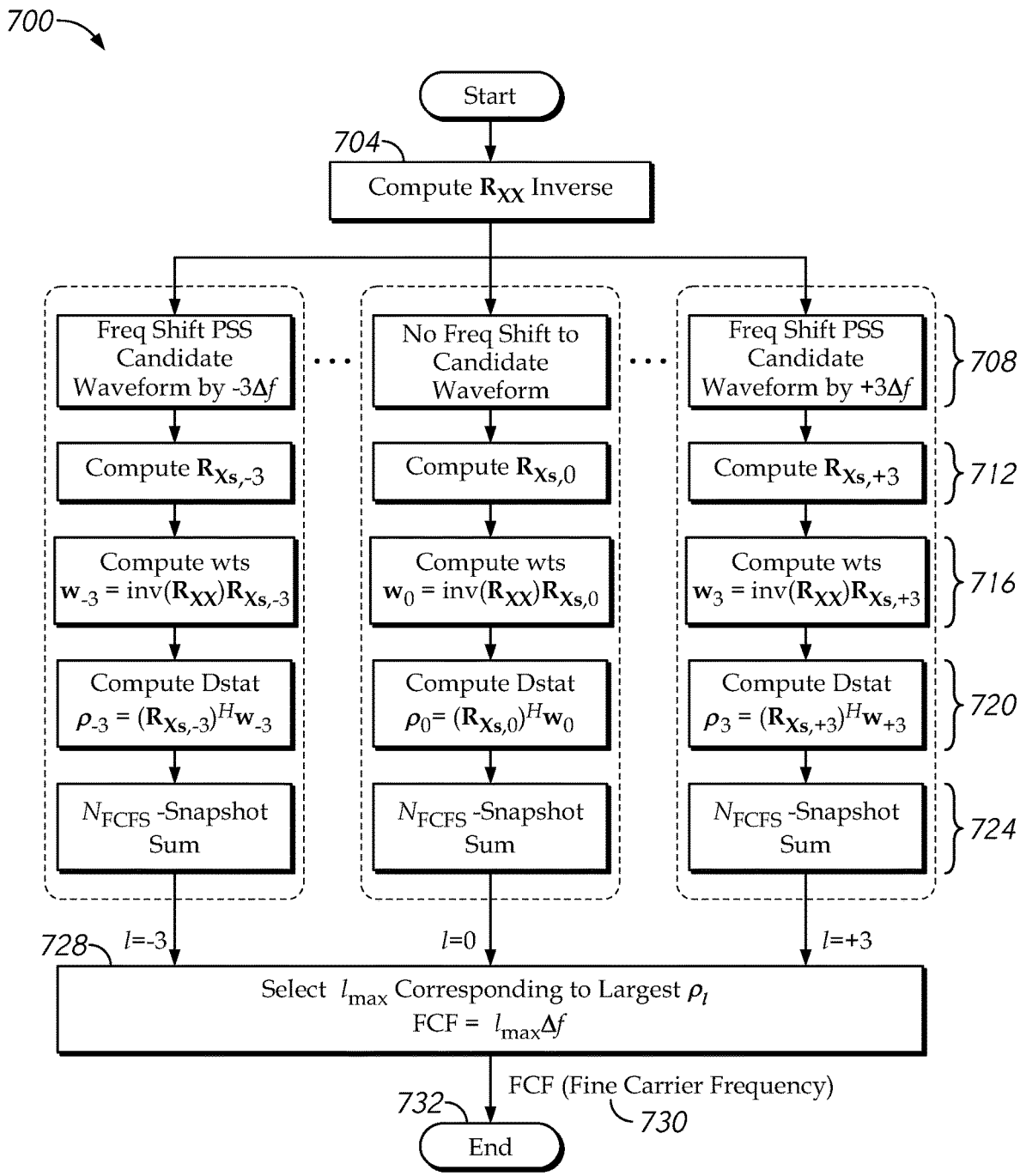

FIG. 7 is a flowchart of a method 700 arranged in accordance with examples described herein. The purpose of method 700 is to perform interference-resistant fine carrier frequency acquisition. In the example of method 700, an FCFS beamformer bank (e.g., FCFS bank 264 of FIG. 2) utilizes a signal parameter, frequency offset (e.g., one or several FCFS frequency offsets), to offset the carrier frequency of each training sequence in the bank for a computation with the PSS symbol data (e.g., OFDM FFT 236 output of FIG. 2) using the SMF-detected (e.g., SMF 216), PSS ID/waveform, also referred to herein as the PSS Zadoff-Chu (ZC) sequence (consistent with 4G LTE and 5G parlance indicating PSS generation in the frequency domain using ZC mathematical constructs) as the basic training sequence to be subjected to such frequency offsets. Per method 700, a present preferred embodiment utilizes input PSS symbol data that have been previously retuned via digital tuner 240 to remove the CCF, as provided by the peak/timing selector 228. Alternatively the basic training sequence can be subjected to the desired FCFS frequency offsets summed with the CCF. The method 700 facilitates providing interference-resistant carrier frequency acquisition as an integral step of network discovery and synchronization.

In a preferred embodiment example of method 700, seven FCF offsets are utilized from −3Δf to +3Δf. In a non-limiting numerical example, such offsets may be from −11.25 kHz to +11.25 kHz on Δf=3.75-kHz centers.

At step 704, the method 700 utilizes the inverse covariance matrix $R_{XX}^{-1}$ of the input data streams, as described below with respect to equation (20) (and depicted in FIG. 7 as inv($R_{XX}$)), for all frequency-offset adaptive beamformers in the FCFS beamformer bank. In utilizing that matrix in common for each beamformer, the method 700 achieves significant computational savings compared to conventional techniques.

Continuing in the example at step 708, method 700 may identify a set of seven (7) fine carrier frequency (FCF) offset PSS templates as:

$$s_{PSS,l} = \frac{\tilde{s}_{PSS,l}}{\sqrt{\tilde{s}_{PSS,l}^H \tilde{s}_{PSS,l}}} \tag{18}$$

where $$\tilde{s}_{PSS,l} = \tag{19}$$

$$FFT\left\{IFFT\{s_{PSS}\} \circ \exp\left[j2\pi l\Delta f \frac{n}{f_s}, n=1, \ldots, N_{FFT\_AZ}\right]\right\}_{PSSBins},$$

$$i = -3, -2, \ldots, 3$$

where "∘" signifies an element-by-element (Hadamard) product, and $S_{PSS}$ is as defined in (5) but dropping the argument (i) representing the SVI-detected PSS code to simplify notation. As before the FFT and IFFT are of size $N_{FFT-Az}$=128, and the right-bracket subscript note "PSS Bins" indicates that only the PSS bins of the FFT are retained. The normalizing denominator in (18) is to prevent FCF measurement biases due to slight amplitude variations in the frequency-domain templates after the PSS bins truncation step.

At steps 712 and 716, the PSS FCFS beamformer weight vector $w_{PSS,l}$ is computed for the lth FCFS frequency shift on each of the $N_{FCFS}$ PSS/FCF acquisition snapshots as $$w_{PSS,l} = R_{XX}^{-1} R_{Xs,l} \tag{20}$$

$$R_{XX} = X^H X \tag{21}$$

$$R_{Xs,l} = X^H S_{PSS,l} \tag{22}$$

where X is the 62×K OFDM FFT of the current-snapshot data matrix for the 62 subcarriers of the hypothesized PSS symbol (DC bin omitted). This formulation is a least-squares (LS) beamformer for extracting a known target waveform $S_{PSS,l}$ from the data X, e.g., it is the linear LS estimator of $S_{PSS,l}$. In the example, the beamformers of method 700 may be generated anew on each snapshot, and each of the seven branches calculates a detection statistic at step 720 over a total of $N_{FCFS}$ snapshots.

At 724, when all $N_{FCFS}$ snapshots have been processed, a set of seven summed PSS detection statistics (Dstats) ρl, l=−3, . . . ,3, is computed for the seven FCFS frequency offsets according to $$\rho_l = \sum_{m=m_{FCFS}}^{m_{FCFS}+N_{FCFS}-1} \gamma_l(m), \tag{23}$$

where $m_{FCFS}$ is the starting snapshot of the $N_{FCFS}$-snapshot PSS/FCF acquisition interval, and $\gamma_l(m)$ is the snapshot m correlation between the lth FCFS beamformer output and its target waveform $s_{PSS,l}$, given by $$\gamma_l(m) = [R_{Xs,l}^H w_{PSS,l}]_{snapshot\ m}. \tag{24}$$

At step 728, the peak of the Dstats in (23) is taken as an initial estimate $f_{f,int}$ of the FCF as $$f_{f,init} = l_{max}\Delta f \quad (25)$$

where $$l_{max} = \underset{l}{\operatorname{argmax}} \rho_l, l = -3, \ldots, 3. \quad (26)$$

This estimate may be refined by interpolation (e.g., quadratic) with the Dstats to either side, producing as $$f_f = l_{INTERP}\Delta f \quad (27)$$

where $$l_{INTERP} = \begin{cases} -2.75; & l_{max} = -3 \\ \text{INTERPQ} \\ \{[l_{max}-1, l_{max}, l_{max}+1], & -2 \le l_{max} \le 2 \\ [\rho_{l_{max}-1}, \rho_{l_{max}}, \rho_{l_{max}+1}]\}; \\ 2.75; & l_{max} = 3 \end{cases} \quad (28)$$

and where in this example INTERPQ{x,y} denotes quadratic interpolation of respective abscissa and ordinate 3-vectors x and y. At step 730, method 700 identifies an FCF frequency, which may be provided for further processing, for example, as system 200 and method 300 may employ the FCF frequency. The method ends at step 732.

Figure 8:
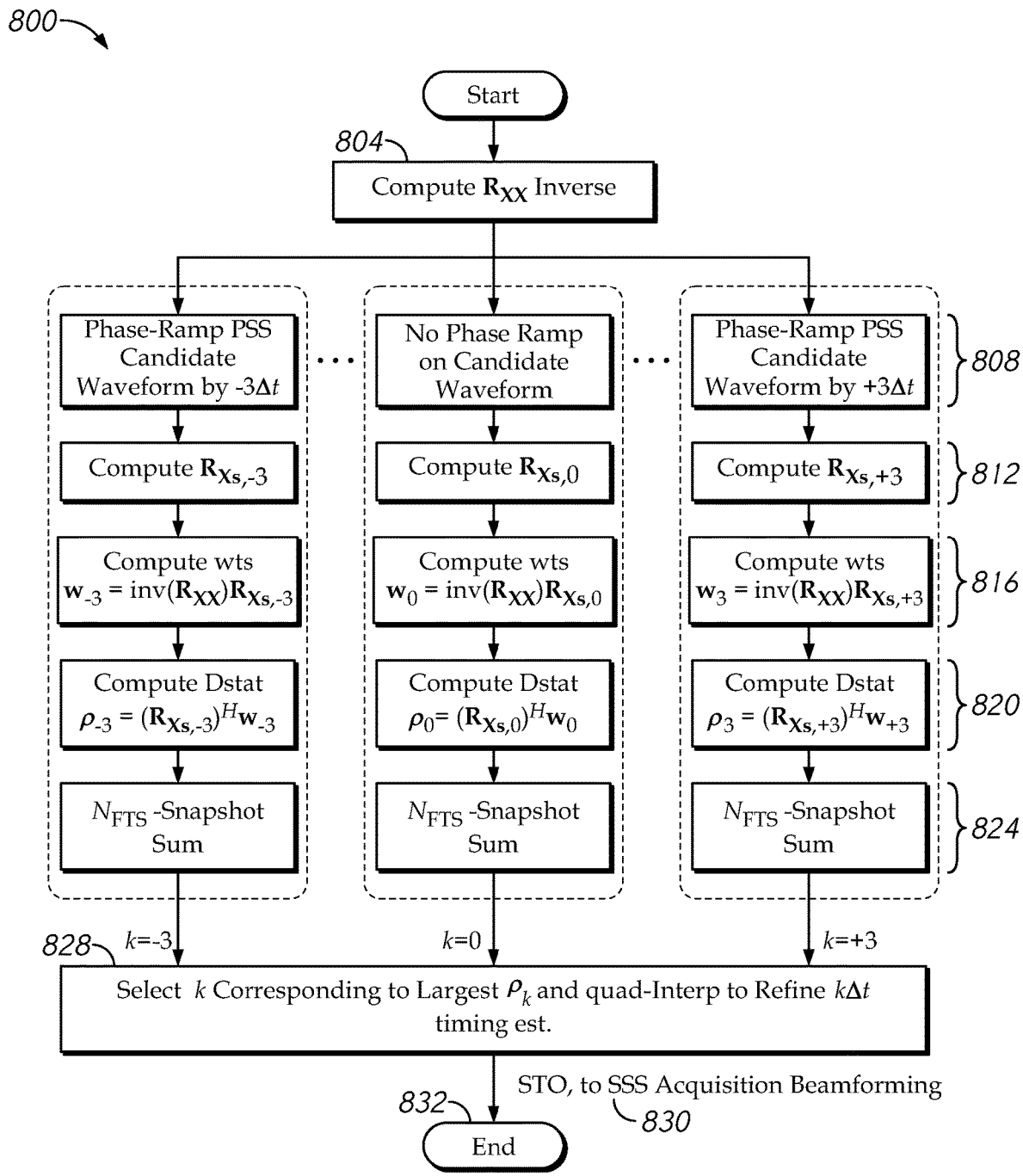

FIG. 8 is a flowchart of a method 800 arranged in accordance with examples described herein. The purpose of method 800 is to perform interference-resistant fine timing acquisition. In the example of method 800, an FTS beamformer bank (e.g., 272 of FIG. 2) may utilize a signal parameter, timing offset (e.g., one or several FTS timing offsets), to offset the timing of each training sequence in the bank for a computation with respective PSS symbol data (e.g., OFDM FFT 260 output of FIG. 2) using the SMF-detected (e.g., SMF 216), PSS ZC sequence as the basic training sequence to be subjected to such timing offsets. Per method 200, a preferred embodiment utilizes input PSS symbol data that have been retuned via digital tuner 244 to remove the FCF, as measured by the prior FCFS beamformer bank 264. Alternatively the basic PSS ZC sequence can be regenerated with the FCFS-measured FCF incorporated into it via digital retuning of its time-domain representation, and subsequent FFT transformation into its OFDM equivalent, prior to application of the training sequence timing offsets. In utilizing the method 800, an FTS beamformer bank may avoid the disadvantages of complex interference cancellation techniques because each beamformer of the FTS beamformer bank may utilize the same inverse covariance matrix when calculating weights for that adaptive beamformer. Therefore, the method 800 may facilitate providing interference-resistant network fine timing acquisition as an integral step of network discovery and synchronization.

In the example of method 800, seven FCF offsets are utilized from $-3\Delta t$ to $+3\Delta t$. In a non-limiting numerical example, such offsets may be from $-1.5$ to $+1.5$ AZ samples on $\frac{1}{2}$-sample centers, with AZ samples being those output from an AZ filter (e.g., AZ filter & decimator 208). Similarly numbered elements of method 800 may operate analogously to those elements of method 700, with additional details described herein for clarity. For example, like step 704 of method 700, at step 804 of method 800, the $R_{XX}^{-1}$ matrix is utilized, as described below with respect to equation (30) (and depicted in FIG. 8 as inv($R_{XX}$)), for all timing offset adaptive beamformers in the FTS beamformer bank. Accordingly, method 800 illustrates PSS/fine timing search (PSS/FTS) processing.

In the example of method 800, seven time-offset LS beamformers perform a fine timing search over $N_{FTS}$ contiguous snapshots ($N_{FTS}=40$, typ.). In some implementations, larger values of $N_{FTS}$ increase fine-timing estimation accuracy at the expense of additional computations. This fine-timing adjustment may be utilized to increase the sensitivity of subsequent SSS processing at an SSS beamformer, for example, as method 900 details. Continuing in the example at step 808, method 800 may identify a set of seven timing offset (STO) PSS templates as:

$$s_{PSS,l} = s_{PSS} \circ \exp\left[j2\pi l\Delta t \frac{n}{N_{FFT\_AZ}}, n = -31, \ldots, 31; n \ne 0\right], \quad (29)$$
$$l = -3, -2, \ldots, 3$$

where $S_{PSS}$ is the same PSS ZC sequence used in (19).

At steps 812 and 816, the PSS FTS beamformer weight vector $w_{PSS,l}$ is computed for the lth FTS STO offset on each of the $N_{FTS}$ PSS FTS snapshots using the LS beamformer equations $$w_{PSS,l} = R_{XX}^{-1} R_{Xs,l} \quad (30)$$

$$R_{XX} = X^H X \quad (31)$$

$$R_{Xs,l} = X^H S_{PSS,l} \quad (32)$$

where X is the 62×K OFDM FFT of the current-snapshot data matrix for the 62 subcarriers of the hypothesized PSS symbol (DC bin omitted). The same $R_{XX}^{-1}$ term appearing in (30), denoted in FIGS. 7-9 as inv($R_{XX}$) for example, may be used for all STO-offset beamformers, which can improve computational savings (e.g., the time spent computing the inverse covariance matrix).

At steps 820 and 824, When all $N_{FTS}$ snapshots have been processed, a set of seven summed PSS detection statistics (Dstats) $\rho_l$, $l=-3,\ldots,3$, is computed for the seven FTS STO offsets according to $$\rho_l = \sum_{m=m_{FTS}}^{m_{FTS}+N_{FTS}-1} \gamma_l(m), l = -3, -2, \ldots, 3, \quad (33)$$

where $m_{FTS}$ is the starting snapshot of the $N_{FTS}$-snapshot PSS FTS acquisition interval, and $\gamma_l(m)$ is the snapshot m correlation between the lth FTS beamformer output and its target waveform $s_{PSS,l}$, given by $$\gamma_l(m) = [R_{Xs,l}^H w_{PSS,l}]_{\text{snapshot } m} \quad (34)$$

At step 828, the peak element of the summed Dstat vector in (33) may be an initial estimate Tina of the STO as $$\tau_{init} = l_{max}\Delta t \quad (35)$$

where $$l_{max} = \underset{l}{\operatorname{argmax}} \rho_l, l = -3, \ldots, 3. \quad (36)$$

This estimate may be refined by interpolation (e.g., quadratic) with the Dstats to either side, producing the STO estimate $\tau_o$ as $$\tau_0 = l_{INTERP} \Delta t \qquad (37)$$

where $$l_{INTERP} = \begin{cases} -2.75; & l_{max} = -3 \\ INTERPQ \\ \{[l_{max}-1, l_{max}, l_{max}+1], & -2 \leq l_{max} \leq 2 \\ [\rho_{l_{max}-1}, \rho_{l_{max}}, \rho_{l_{max}+1}]\}; \\ 2.75; & l_{max} = 3 \end{cases} \qquad (38)$$

and where INTERPQ{x,y} denotes in this example quadratic interpolation of respective abscissa and ordinate 3-vectors x and y. At step 830, method 800 provides the identified timing offset (e.g., FTS timing offset, to 276), for use in further processing, for example, as system 200 and method 300 may employ the timing offset (STO). As depicted, for example, the timing offset (STO) may be provided to an SSS beamformer (e.g., SSS beamformer bank 280). The method ends at step 832.

Figure 9:
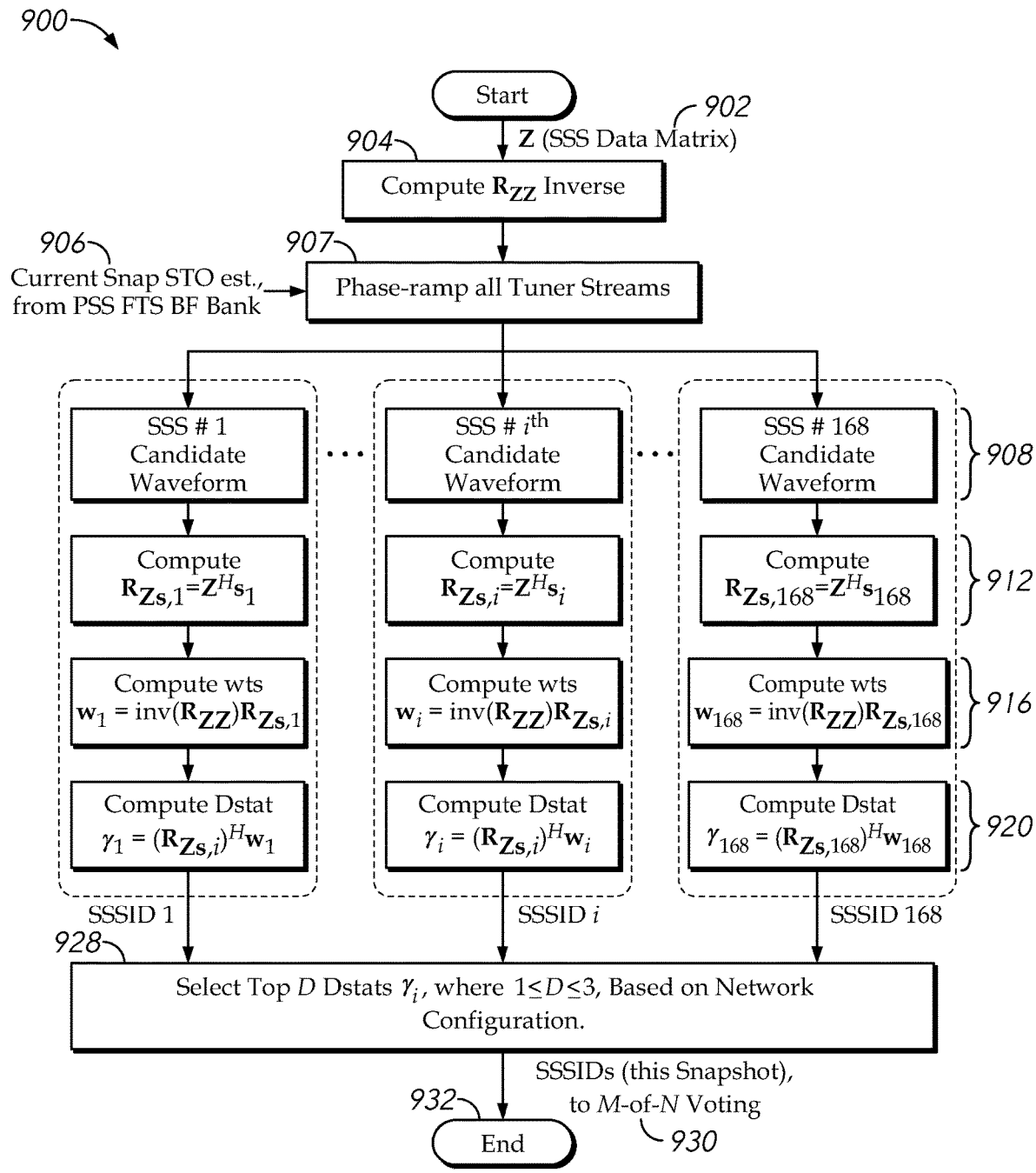

FIG. 9 is a flowchart of a method 900 arranged in accordance with examples described herein. The purpose of method 900 may be to perform interference-resistant detection of any and all SSS signals received with SSS symbol timing consistent with and reciprocal to the PSS/CCF detection peak under test. In the example of method 900, an SSS beamformer bank (e.g., 272 of FIG. 2) may utilize a signal parameter, the SSS ID of an SSS signal (e.g., one or several such SSS IDs), to generate each training sequence in the bank for a computation with respective retuned (CCF and FCF removed) SSS symbol data (e.g., OFDM FFT 252 output of FIG. 2). In the present SSS beamformer bank example training sequences are generated for the full set of all possible SSS IDs (e.g., $N_{SSS}$=168 such IDs), then shifted in timing to match the previously measured STO estimate $\tau_o$ for use in the SSS beamformer bank. In utilizing the method 900, an SSS beamformer bank may avoid the disadvantages of complex interference cancellation techniques because each adaptive beamformer of the SSS beamformer bank may utilize the same inverse covariance matrix when calculating weights for that adaptive beamformer. Therefore, the method 900 may facilitate providing interference-resistant SSS identification, and integral step of network discovery and synchronization.

In the example of method 900, one hundred sixty-eight (168) SSS training sequences are utilized. Similarly numbered elements of method 900 may operate analogously to those elements of method 700, with additional details described herein for clarity. For example, like step 704 of method 700, at step 904 of method 900, an analog of the $R_{XX}^{-1}$ matrix is utilized, as described below with respect to equation (39) (and depicted in FIG. 9 as $R_{ZZ}$ Inverse), for the SSS sequence beamformers in the SSS beamformer bank. Accordingly, method 900 illustrates the SSS ID search among various SSS sequences. The method 900 may achieve the SSS acquisition using $N_{SSS}$=168 adaptive least-squares (LS) beamformers to perform a multiple hypothesis test over N contiguous snapshots. Larger values of N may increase MHT performance (e.g., lower false-alarm and miss rates), although with additional computations. While 168 SSS training sequences are shown in the example of method 900, other numbers of training sequences may be utilized. In various implementations, the number of training sequences may vary based on a wireless protocol utilized or a selected number of training sequences based on a particular format for the SSS IDs.

At step 907, the method 900 may receive the STO estimate (e.g., FTS timing offset, to 276) from an FTS beamformer (e.g., FTS beamformer bank 272), as computed by method 800. With the STO estimate, all training sequences may be phase-ramped to match the measured STO, or alternatively all SSS symbol data streams may be inverse phase ramped to remove the measured STO. The present embodiment utilizes the former strategy. At step 908, a separate SSS LS beamformer is computed for each SSS sequence.

At steps 912 and 916, the ith branch computes weight vector $w_{SSS,i}$ for the ith SSS sequence (SSSID i) on each of the N acquisition snapshots as $$w_{SSS,i} = R_{ZZ}^{-1} R_{Zs,i} \qquad (39)$$

$$R_{ZZ} = Z^H Z \qquad (40)$$

$$R_{Zs,i} = Z^H (s_{SSS,i} \circ p_{\tau_0}) \qquad (41)$$

where $s_{SSS,i}$ is the ith SSS sequence, Z is the 62×K OFDM FFT of the current-snapshot data matrix for the 62 subcarriers of the hypothesized SSS symbol (DC bin omitted), $\tau_0$ is the STO estimate (37) from the PSS FTS beamformer bank, $p_{\tau_0}$ is the phase ramp corresponding to $\tau_o$, $$p_{\tau_0} = \exp\left\{-j2\pi\tau_0 \frac{f}{N_{FFT}}\right\}, f = -31, -30, \ldots, 31; f \neq 0 \qquad (42)$$

and "∘" signifies the Hadamard product. Alternatively, to reduce computations the conjugate of phase ramp $p_{\tau_0}$ may be pre-applied one time directly to each column of the SSS symbol data Z, allowing the unramped $s_{SSS,i}$ to be used in (41). The same inverse spatial covariance $R_{ZZ}^{-1}$ term in (39), denoted as inv($R_{ZZ}$) in FIG. 9, may be used for all beamformers, as computed at step 904, to provide a computational efficiency.

At step 920, a set of $N_{SSS}$ detection statistics (Dstats) may be computed for each adaptive beamformer of current snapshot m as $$\gamma_i(m) = [R_{Zs,i}^H w_{SSS,i}]_{snapshot\ m}; i=1,\ldots,N_{SSS}. \qquad (43)$$

These detection statistics are assembled into $N_{SSS}$-element detection statistic vector as $$\gamma(m) = [\gamma_i(m)]; i=1,\ldots,N_{SSS}. \qquad (44)$$

At step 928, for each of the N snapshots used for SSS acquisition (where in a typical embodiment a total of N=20 snapshots may be processed), the top D detection statistics are identified and sent, along with their SSSIDs, to an N-snapshot voting pool. If we define the reverse order statistic (from largest to smallest) of the snapshot m detection statistic vector γ(m) as the reordering (dropping the m argument)

$$t(\gamma_1, \gamma_2, \ldots \gamma_{N_{SSS}}) = (\gamma_{(1)}, \gamma_{(2)}, \ldots, \gamma_{(N_{SSS})}),$$

where $$\gamma_{(1)} \geq \gamma_{(2)} \geq \ldots \geq \gamma_{(N_{SSS})} \qquad (45)$$

this yields a corresponding reordering of the SSSIDs as $i_{(1)}, i_{(2)}, \ldots, i_{(N_{SSS})}$, from which the top D elements are taken to form the current snapshot-m SSSID vote vector $d_m$ of length D, $$d_m = [i_{(1)} i_{(2)} \ldots i_{(D)}]^T; \ m=1, \ldots, N. \quad (46)$$

These vote vectors may be serially abutted for all N SSS acquisition snapshots to form a voting pool vector P of size ND, as $$P = [p_1 p_2 \ldots p_{ND}]^T = [d_1^T d_2^T \ldots d_N^T]^T \quad (47)$$

The number of elements in P having SSSID i as the SSSID vote count c(i) may be defined as $$c(i) = \sum_{k=1}^{ND} \delta_{p_t, i}; \ i = 1, \ldots, N_{SSS}, \quad (48)$$

where $\delta_{k,l}$ is the kronecker delta function, e.g., $$\delta_{k,l} = \begin{cases} 1; & k = l \\ 0; & k \neq l \end{cases}. \quad (49)$$

An M-of-N voting rule may be implemented by declaring the following SSSIDs present in the tested SSS symbol data as the set $$\text{SSSIDs Present} = \{i : c(i) \geq M\}, \quad (50)$$

where $2 \leq M \leq 8$. A value M=4 generally yields sensitive SSS detection at a low false-detection rate; smaller values of M increase detection sensitivity at the cost of an increase in false detections.

At step 930, method 900 identifies SSS IDs, which may each be associated with a different cell or sector in the vicinity of the RN. Additionally, these SSSIDs may be used in downstream RN processing to derive cell/sector identification for each SSSID, demodulate the associated public broadcast channel (PBCH), and decode the information needed to select a cell/sector for network entry. The method ends at step 932.

The blocks included in the described example methods 600, 700, 800, and 900 are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 10:
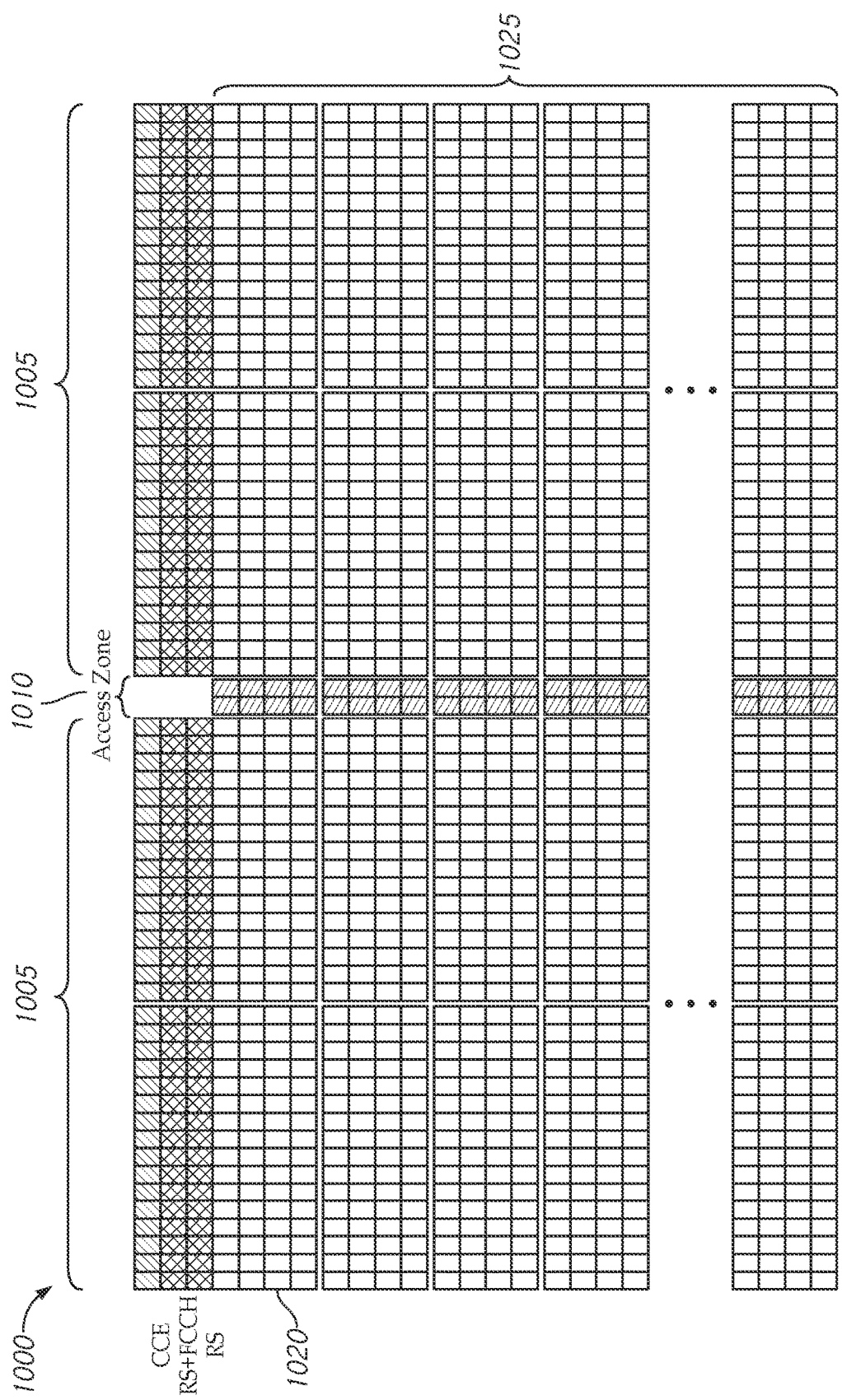
FIG. 10 illustrates an example frame that may be received by the systems described throughout.

FIG. 10 illustrates an example frame 1000 that may be received by the systems described throughout. The frame 1000 spans over various frequency bands with subbands represented as vertical columns. Two groups of such subbands 1005 are shown, which may be referred to as payload zones; as well, a small group of two such subbands is shown as the Access Zone (AZ) 1010.

Accordingly, the frame may be used to represent an OFDM wireless protocol, in which case the horizontal rows represent OFDM symbols, each symbol of which represents one block of computation and output by the OFDM FFT. In such a representation, each subband contains multiple OFDM FFT bins, not shown, in which each bin may carry a single QAM constellation value (e.g., 256QAM) for the symbol duration. Depending on the wireless protocol, these may be payload symbols 1025 (e.g., data symbols) if outside the AZ, or symbols related to network discovery, access, and control if inside the AZ 1010. As an example of the former, the symbol 1020 is an OFDM payload data symbol in the first subband of the frequency range over which the frame 1000 was received. As an example of the latter, the AZ 1010 comprises the center two subbands, in which there occurs at least one OFDM symbol comprising the PSS and at least one OFDM symbol comprising the SSS. Accordingly, the symbols of the AZ 1010 are filtered by receivers for network discovery and synchronization as described herein. Additional control channels may also reside outside the AZ, including Control Channel Element (CCE) symbols, reference symbol (RS) symbols, and RS+FCCH symbols.

Figure 11:
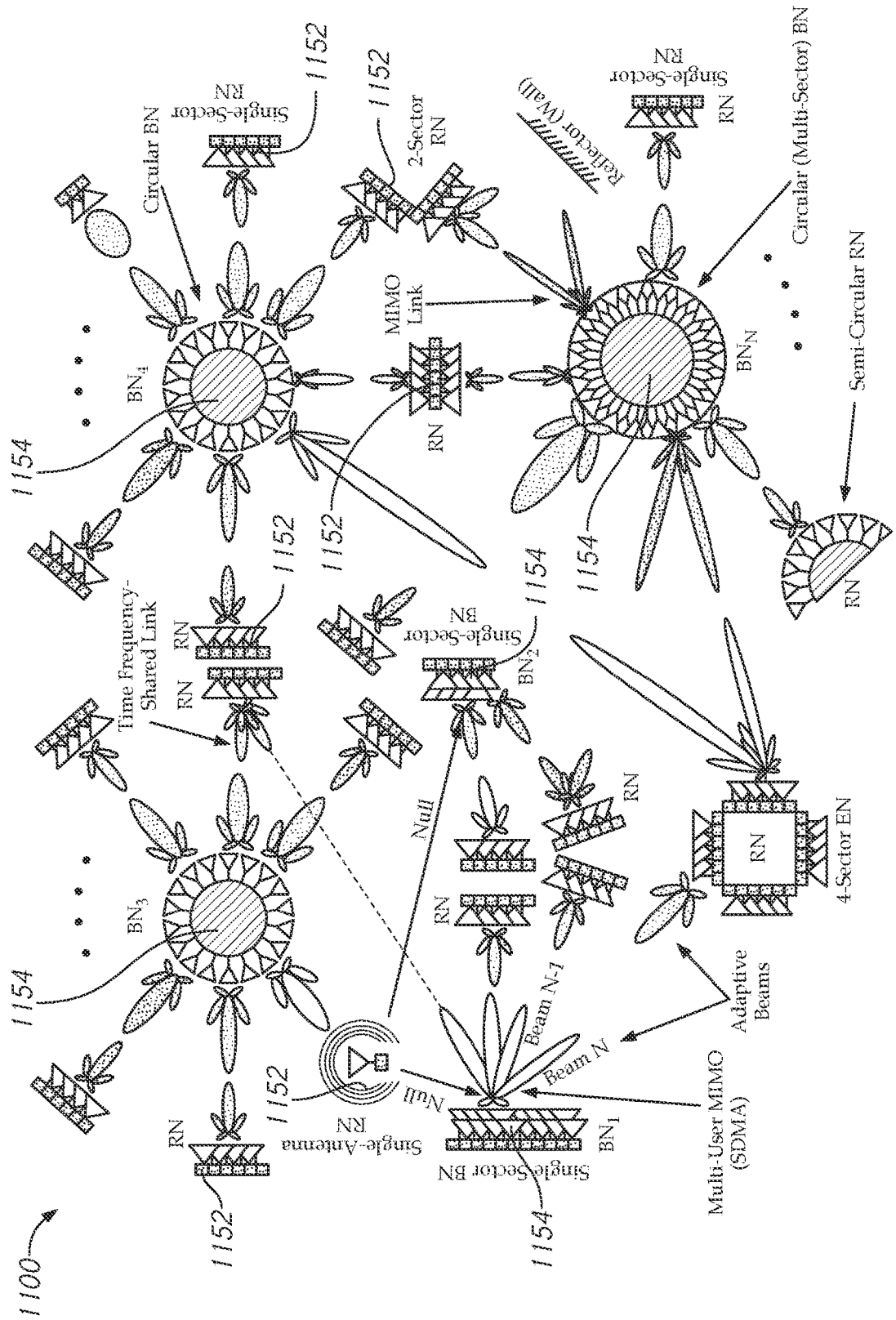
FIG. 11 illustrates an example of an implementation of a non-line of sight (NLOS) communication system.

FIG. 11 illustrates an example of an implementation of a non-line-of-sight communication system 1100. The system 1100 may be a wireless data network that may be a point to point (P2P), point to multi-point (P2MP) or a multi-point to multi-point (MP2MP) STAP system that uses adaptive arrays. The system 1100 has two types of nodes including a base node (BN) 1154, and a remote node (RN) 1152. The BNs 1154 are generally connected to the main wired network through some high capacity/low latency connection (e.g. fiber or microwave). RNs 1152 connect back to the wired network wirelessly through the BNs 1154. Each BN 1154 has one or more RNs attached to it as depicted in FIG. 11, and each RN 1152 can associate with one or more BNs 1154. RNs are also referred to as consumer nodes, as they are often used to deliver network services to customers. Nodes of the same type need not be homogeneous (e.g., they may differ in the number of antennas, antenna/array geometry, number of beams, bandwidth, and signal processing capability). RNs may not associate with other RNs 1152 and BNs 1154 may not associate with other BNs 1154 in some examples. The BN 1154 multiplexes the data to its RNs 1152 attached either in space, time, code, frequency, or some combination of both. Similarly, the RN 1152 multiplexes its data to the BNs 1154 its attached to either spatially, or in time, frequency, or code or some combination of both. Each RN 1152 may associate with multiple BN 1154 either to increase its capacity or to improve its reliability and diversity. The link between a RN 1152 and a BN 1154 can either be composed of a single stream or multiple streams separated (MIMO) in polarization, space, along multiple propagation paths (multipath) or some other antenna property (if the channel conditions permit). The BNs 1154 can either split or reuse the channel (e.g. spectrum resources). The spectrum may also be unlicensed or shared with other applications. The network can be extended to include multiple hops. However, the additional hops do not increase the capacity of the network. The network is not restricted to any particular frequency band (e.g. 2 GHz, 20 GHz, 60 GHz, etc.), being licensed or unlicensed, or signal bandwidth (e.g. 10 MHz, 100 MHz, 1 GHz . . . ), propagating environment (e.g. indoor/outdoor, urban/suburban/rural, LOS/NLOS/nLOS, fixed/mobile), as long as the hardware is capable. In fact, the network can be a hybrid of all of the above. Accordingly, a RN 190, with a system 200 implementing its beamforming subsystem 104, may operate as a RN 1152 in the system 1100, for example, as one or more of the RNs 1152.

In some implementations, the BNs 1154 may utilize scattercast signaling. For example, scatter-cast signaling may be transmitted by the BNs using fixed-amplitude random-phase transmit weights on each element of the BN array. A vector of random phases is generated prior to each frame and applied across the elements of the transmit array. This vector is held fixed during each frame, producing random BN radiation patterns from frame to frame while harnessing the full sum power of all PAs in the transmitter bank. Each pattern may have significantly lower total beamwidth, but longer reach, than a single-element transmission. Over time (e.g., on the order of 20 frames), the random radiation patterns cumulatively cover the full FOV of the antenna elements.

Scatter-cast signaling transmit weights are generated for frame 1 by $$w_l = [w_{l,k}] : w_{l,k} = A \exp(j\theta_{lK+k}), k=1, \ldots, K, \quad (51)$$

where K is the number of elements on the BN array, A is a fixed amplitude factor selected to achieve robust coverage to the cell edge, within regulatory power limits if required, and the $\theta_i$ form an independent sequence of random phases uniformly distributed over $[-\tau, \tau]$. Scatter-cast weights are used by the current invention to transmit PSS and SSS symbols, but are equally beneficial for transmission of other broadcast signals such as the PBCH in LTE. The multi-frame averaging and M-of-N voting logic of method 900 may be utilized with this scatter-cast PSS and SSS signaling, for example.

Figure 12:
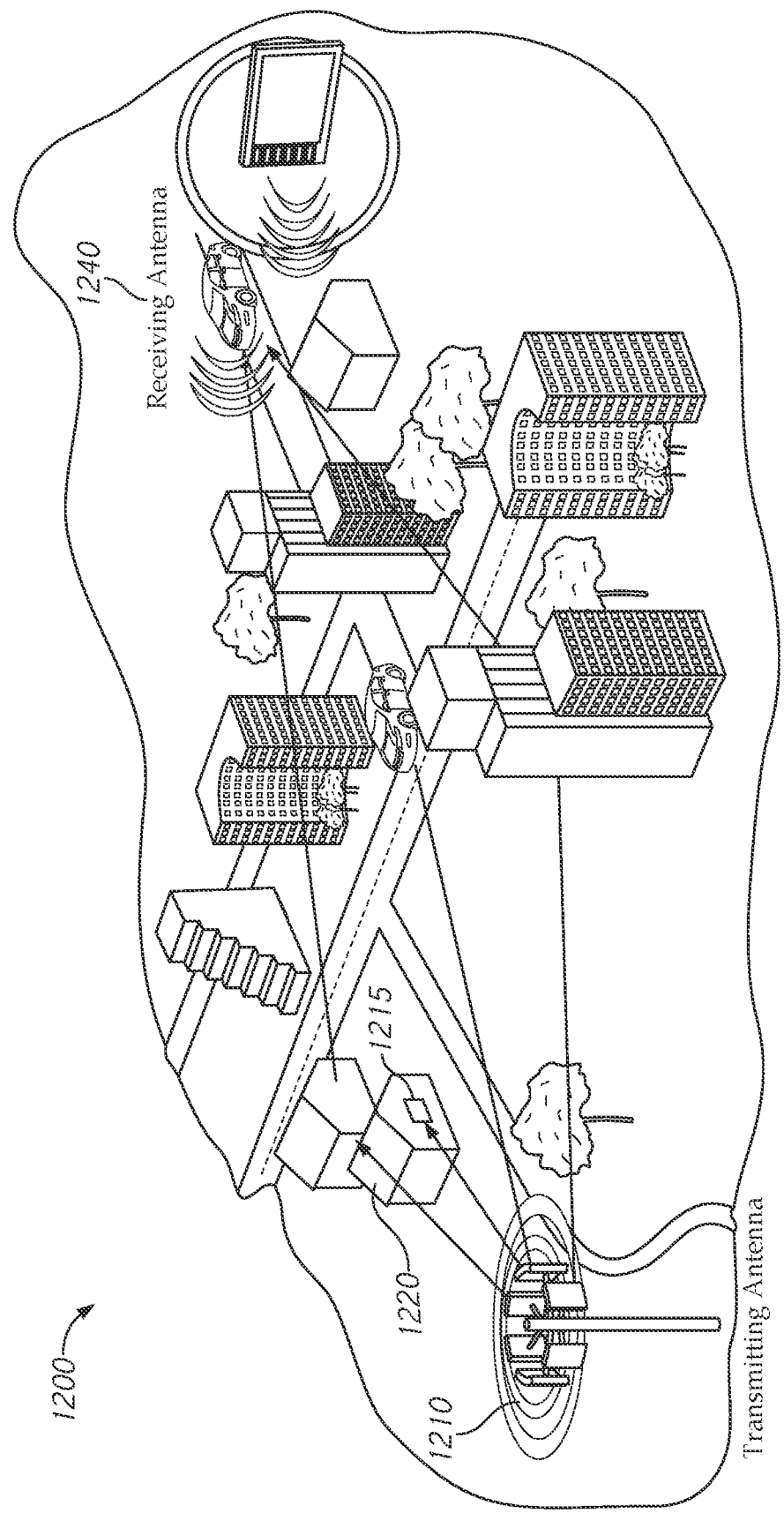
FIG. 12 is a schematic illustration of a system in accordance with examples described herein.

FIG. 12 is a schematic illustration of a communication system arranged in accordance with examples described herein. The communication system 1200 of FIG. 12 includes a base node (BN) 1210 and one or more remote nodes (e.g., an RN 190), such as remote node 1215 and remote node 1240. Generally, data may be communicated between the base node 1210 and the one or more remote nodes (e.g., remote node 1215 and/or remote node 1240) using techniques described herein. For example, when receiving link signals from a base node or searching for link signals from a BN, a remote node (e.g., RN 190) may utilize any or all of system 200, method 300, system 400, method 600, method 700, method 800, and method 900 to identify PSS signals through the use of spatial whiteners and adaptive beamformers, to identify one or more SSS IDs of BN(s), and/or to achieve time- and frequency-synchronization thereto, through unlicensed and/or licensed co-channel interference.

Base nodes may be implemented, for example, using an antenna array, filters, digital signal processor(s), one or more network switches (e.g., Ethernet switches), and/or other electronic components. Base nodes may include encoders and decoders as described herein. The base node 1210 may be in communication (e.g., wired communication using fiber, cables, wires, etc.) with a network, such as the Internet. A base node, such as base node 1210 may be positioned in an environment to provide wireless communication services (e.g., Internet connectivity) to multiple remote nodes within communication distance of the base node. Base nodes may include an adaptive antenna array, which may collect and/or transmit incident energy from and/or to multiple simultaneous beams of the same channel.

Base nodes described herein can exploit spatial diversity to maintain multiple, bidirectional MIMO streams with each remote node. Base nodes described herein can also receive and process multiple simultaneous beams using the same channel because the system is able to perform extreme interference cancellation to eliminate interference between the various remote node signals. This extreme interference cancellation capability applies also to non-network (e.g., unlicensed) interference. For example, base nodes described herein may direct spatial nulls in the array antenna pattern in the directions of all interfering remote nodes and non-network interferers while forming a beam peak in the direction of the desired remote node. This process may be replicated for each desired remote node in communication with the base node, thus forming multiple beams and mutual spatial nulling that cancels interference.

Remote nodes may be implemented, for example, using an antenna array, filters, digital signal processor(s), and may include encoders and/or decoders as described herein. Remote nodes may be placed, for example, on residential or commercial buildings (such as remote node 1215). A remote node may be coupled to a wired connection (e.g., an Ethernet cable) and may provide Internet services to a residence, company, or other occupants of the building. In an analogous manner, a remote node (such as remote node 1240) may be provided in a mobile device (e.g., an automobile, train, bus, helicopter, aircraft, boat, tablet, phone). The mobile device may receive Internet services through communication with the base node 1210. Mobile nodes may include an adaptive antenna array, which may collect and/or transmit incident energy from and/or to multiple simultaneous beams of the same channel.

Remote nodes described herein may exploit spatial diversity to maintain multiple, bidirectional MIMO streams with a given base node. Remote nodes described herein may also receive and process multiple simultaneous beams using the same channel, because the system may be able to perform extreme interference cancellation to eliminate interference between various base node signals. This extreme interference cancellation capability applies also to non-network (e.g., unlicensed) interference. For example, remote nodes described herein may direct spatial nulls in the array antenna pattern in the directions of all interfering base nodes and non-network interferers while forming a beam peak in the direction of the desired base node.

In some examples, one or more remote nodes may be located adjacent and/or coupled to a picocell and may provide a connection between the picocell and the network as a backhaul network. For example, a wireless backhaul described herein may be used to connect wireless base stations to the core network and/or the operator's point-of-presence and facilitate the backhaul connection of all types of base stations, including femto, pico, micro, mini, and macro base stations. In some examples, communication systems described herein may be used for wireless broadband bridging and last mile extensions of copper, cable and/or fiber plant.

In some examples, the communication system 1200 may be a non-line-of-sight system. In some examples, the non-line-of-sight system may be a multipoint internet wireless system, which may be implemented using a star architecture. Accordingly, each receiver (e.g., receivers in the base node 1210 and/or remote nodes) may receive multiple multipath versions of transmitted data as the signals are propagated off of reflectors in the environment (e.g., other buildings, trees, people, etc.). The communication system 1200 may operate at frequencies intended for use in non-line-of-sight systems, such as frequencies below 7 GHz. The communication system 1200 may operate at, for example, 5.1 GHz and/or 5.8 GHz which are unlicensed spectrum bands in the U.S. Operating at that frequency generally refers to transmitting and/or receiving by the base node and/or remote nodes at the specified frequencies.

An example communication system described herein may support a number of links, e.g., M links, where each link generally includes a remote node and a base node. Each base node may support multiple links, and any number of base nodes may be present in a system. Each link may have a spectral efficiency, expressed as Q bits per second (bps)/Hz where Q generally ranges from 1 to 15 bps/Hz, although other spectral efficiencies may be used. Accordingly, a spectral efficiency at a base node may be MQ, if M is the number of links supported by the base node.

Generally, a link may include a shared adaptive antenna array at the base node and one or more directional antennas and/or antenna arrays at the remote node participating in the link. Base nodes described herein may utilize beamforming techniques which may facilitate performance of communication systems. Remote nodes having antenna arrays may also utilize beamforming techniques which may facilitate the performance of the system. For example, one or more remote nodes and/or base nodes may calculate beamforming weights for their antenna array(s) using data, such as a frame start preamble or sub-frame start preamble transmitted by the opposing node(s), as a reference. In addition, such references can be located arbitrarily within a frame or sub-frame, not restricted to being placed at the start. When adaptive arrays are used in both the base nodes and remote nodes, adaptive arrays may be arranged to maximize the signal-to-interference-plus-noise ratio (SINR) by, for example, pointing an antenna beam toward the other end of the link, and by reducing interference by directing spatial nulls of the array toward these sources of link degradation. Accordingly, base nodes and/or remote nodes described herein may utilize beamforming techniques to direct spatial nulls toward sources of link degradation (e.g., other remote nodes in the communication system).

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signals may be provided directly to and/or received directly from the recited components without intervening components, but also may be provided to and/or received from the certain components through intervening components.

What is claimed is:

1. A method for calculating a plurality of beamforming weights, the method comprising:
   receiving a plurality of reference signals for calculating a plurality of beamforming weights;
   generating a plurality of training sequences, each training sequence generated according to a signal parameter value or a reference signal waveform, the plurality of training sequences corresponding to a plurality of signal parameter values spanning a range, or a plurality of reference signal waveforms spanning a range of signal identification values;
   for each training sequence of the plurality of training sequences:
   calculating a plurality of beamforming weights based on a matrix comprising a Fast Fourier Transform (FFT) of array data spanning orthogonal frequency-division multiplex (OFDM) symbols indicative of a respective training sequence;
   calculating a plurality of detection statistics based on the plurality of beamforming weights; and
   selecting one of the plurality of beamforming weights, and an associated signal parameter or identifier, based on at least one of the plurality of detection statistics indicating a processing result or a set of processing results of the respective training sequence, as a plurality of beamforming weights for processing of data streams to be received, and as a plurality of signal parameters or identifiers to be reported or utilized in subsequent processing.

2. The method of claim 1, wherein the signal parameter corresponds to at least one of a coarse carrier frequency offset, a fine-carrier frequency offset, a timing offset, or a reference signal waveform or identity.

3. The method of claim 1, wherein method further comprises:
   calculating an OFDM FFT for each training sequence of the plurality of training sequences.

4. The method of claim 1, wherein the matrix comprising the FFT of the OFDM symbols indicative of the respective training sequence is based on a spatial diversity of a plurality of antennas, the plurality of antennas being configured to receive reference signals on which the plurality of training sequences are based.

5. The method of claim 1, wherein the plurality of detection statistics includes at least one detection statistic indicative of waveform signal to interference plus noise ratio (SINK).

6. The method of claim 1, wherein selecting one of the plurality of beamforming weights further comprises:
   for each training sequence of the plurality of training sequences, calculating a sum, mean, or median of the at least one detection statistic over several frames or data snapshots to generate a peak statistic; and
   selecting, from among the generated peak statistics, a maximum peak based on a decision threshold.

7. The method of claim 6, wherein selecting one of the plurality of beamforming weights further comprises:
   interpolating the maximum peak with corresponding statistics to refine an estimate of the maximum peak.

8. The method of claim 6, wherein selecting one of the plurality of beamforming weights further comprises:
   selecting, based on the maximum peak, the one of the plurality of beamforming weights from the respective training sequence of the plurality of training sequences as the plurality of beamforming weights for the processing of the data streams to be received;
   selecting, based on the maximum peak, the one of the plurality of signal parameters or identities from the respective training sequence of the plurality of training sequences as the plurality of signal parameters or identities to be reported; and
   storing the plurality of beamforming weights, associated signal parameters, identities, or combinations thereof, for the processing of the data streams.

9. The method of claim 1, further comprising:
   based on the selected one of the plurality of beamforming weights, generating secondary symbol synchronization (SSS) sequences to identify a base station node (BN).

10. A system comprising:
    a remote node, communicatively coupled to a plurality of antennas, the remote node configured to:
    receive, at the plurality of antennas, a plurality of reference signals for calculating a plurality of beamforming weights;
    generate, based at least on a signal parameter value or a reference signal waveform, a plurality of training sequences;
    calculate, for each training sequence, the plurality of beamforming weights based on a matrix comprising a Fast Fourier Transform (FFT) of an array of data spanning orthogonal frequency-division multiplex (OFDM) symbols indicative of a respective training sequence;

calculate, for each training sequence, a plurality of detection statistics based on the plurality of beamforming weights; and select one of the plurality of beamforming weights and an associated signal parameter or identifier.

11. The system of claim 10, wherein the plurality of training sequences corresponds to a plurality of signal parameter values spanning a range, or a plurality of reference signal waveforms spanning a range, or signal identification values.

12. The system of claim 11, wherein the remote node is further configured to:

select one of the plurality of beamforming weights, and the associated signal parameter or identifier, based at least on one of the plurality of detection statistics indicating a processing result or a set of processing results of the respective training sequence, as the plurality of beamforming weights for processing of data streams to be received by the plurality of antennas, and as the plurality of signal parameters or identifiers to be reported or utilized in subsequent processing by the remote node.

13. The system of claim 10, wherein the signal parameter corresponds to at least one of a coarse carrier frequency offset, a fine-carrier frequency offset, a timing offset, or a reference signal waveform or identity.

14. The system of claim 10, wherein the remote node is further configured to:

calculate an OFDM FFT for each training sequence of the plurality of training sequences.

15. The system of claim 12, wherein the matrix comprising the FFT of the array of data spanning the OFDM symbols indicative of the respective training sequence is based on a spatial diversity of the plurality of antennas.

16. The system of claim 12, wherein the plurality of detection statistics comprises at least one detection statistic indicative of waveform signal to noise ratio (SINK).

17. The system of claim 16, wherein the remote node is further configured to:

for each training sequence of the plurality of training sequences, calculating a sum, mean, or median of the at least one detection statistic over several frames or data snapshots to generate a peak statistic, and selecting, from among the generated peak statistics, a maximum peak based on a decision threshold.

18. The system of claim 17, wherein the remote node is further configured to:

interpolate the maximum peak with corresponding statistics to refine an estimate of the maximum peak.

19. The system of claim 17, wherein the remote node is further configured to:

select, based on the maximum peak, the one of the plurality of beamforming weights from the respective training sequence of the plurality of training sequences as the plurality of beamforming weights for the processing of the data streams to be received;

select, based on the maximum peak, the one of the plurality of signal parameters or identities from the respective training sequence of the plurality of training sequences as the plurality of signal parameters or identities to be reported; and store the plurality of beamforming weights associated signal parameters, identifiers, or combinations thereof for the processing of the data streams to be received.

20. The system of claim 10, wherein the remote node is further configured to: based on the selected one of the plurality of beamforming weights, generate secondary symbol synchronization (SSS) sequences to identify a base station node (BN).

* * * * *